US009074596B2

(12) United States Patent
Miyamoto

(10) Patent No.: US 9,074,596 B2
(45) Date of Patent: Jul. 7, 2015

(54) APPARATUS AND METHOD FOR CONTROLLING ELECTRIC OIL PUMP

(75) Inventor: Shogo Miyamoto, Isesaki (JP)

(73) Assignee: HITACHI AUTOMOTIVE SYSTEMS, LTD., Hitachinaka-shi (JP)

( * ) Notice: Subject to any disclaimer, the term of this patent is extended or adjusted under 35 U.S.C. 154(b) by 635 days.

(21) Appl. No.: 13/425,866

(22) Filed: Mar. 21, 2012

(65) Prior Publication Data

US 2012/0245820 A1    Sep. 27, 2012

(30) Foreign Application Priority Data

Mar. 22, 2011  (JP) ................................. 2011-061893
Feb. 21, 2012  (JP) ................................. 2012-034800

(51) Int. Cl.
| | |
|---|---|
| *F04B 49/20* | (2006.01) |
| *F16H 61/00* | (2006.01) |
| *F16H 61/662* | (2006.01) |
| *F16H 59/72* | (2006.01) |

(52) U.S. Cl.
CPC .................. *F04B 49/20* (2013.01); *F16H 59/72* (2013.01); *F04B 2201/1201* (2013.01); *F04B 2203/0209* (2013.01); *F16H 2312/14* (2013.01); *F16H 61/0031* (2013.01); *F16H 61/66272* (2013.01)

(58) Field of Classification Search
CPC ............. F04B 49/20; F04B 2201/1201; F04B 2203/0209; F16H 61/0031; F16H 61/66272; F16H 59/72; F16H 2312/15
USPC ....... 123/196 R, 198 C, 198 P; 701/102, 110, 701/113; 184/11.3; 475/159; 476/8; 417/15, 417/212
See application file for complete search history.

(56) References Cited

U.S. PATENT DOCUMENTS

| | | | | |
|---|---|---|---|---|
| 6,769,502 | B2 * | 8/2004 | Nakamori et al. | 180/65.25 |
| 7,465,250 | B2 * | 12/2008 | Tamai et al. | 477/3 |
| 7,953,533 | B2 * | 5/2011 | Tsuda | 701/51 |
| 8,146,690 | B2 * | 4/2012 | Tamai et al. | 180/65.275 |
| 2002/0091034 | A1 * | 7/2002 | Nakamori et al. | 477/3 |
| 2002/0107103 | A1 * | 8/2002 | Nakamori et al. | 475/116 |
| 2003/0148850 | A1 * | 8/2003 | Tomohiro et al. | 477/3 |
| 2004/0029677 | A1 * | 2/2004 | Mori et al. | 477/3 |
| 2009/0074590 | A1 * | 3/2009 | Tsuda | 417/3 |
| 2009/0105918 | A1 * | 4/2009 | Kobayashi et al. | 701/67 |
| 2009/0242290 | A1 * | 10/2009 | Kobayashi | 180/65.265 |
| 2010/0228452 | A1 * | 9/2010 | Hosoya et al. | 701/51 |
| 2011/0129356 | A1 * | 6/2011 | Kobayashi et al. | 417/44.1 |

(Continued)

FOREIGN PATENT DOCUMENTS

| | | |
|---|---|---|
| JP | 2007-320353 A | 12/2007 |
| JP | 2011-038601 A | 2/2011 |

*Primary Examiner* — Hieu T Vo
*Assistant Examiner* — Sherman Manley
(74) *Attorney, Agent, or Firm* — Foley & Lardner LLP

(57) ABSTRACT

An electric oil pump for supplying oil to at least a part (a clutch) of a transmission is provided in parallel with a mechanical oil pump which is driven by an engine and supplies oil to each part of the transmission. In advance of an operation request to the electric oil pump, the electric oil pump is rotated at a first operation-preparation rotational speed which is a very low speed so as to replace oils in oil pipes controlled by the electric oil pump. Thereafter, the electric oil pump is rotated at a second operation-preparation rotational speed which is a relatively-high speed, and when an actual rotational speed reaches the second operation-preparation rotational speed, it is determined that operation preparation is completed.

18 Claims, 19 Drawing Sheets

(56) References Cited

U.S. PATENT DOCUMENTS

| | | | |
|---|---|---|---|
| 2011/0135499 A1* | 6/2011 | Lee et al. | 417/44.1 |
| 2011/0166727 A1* | 7/2011 | Light et al. | 701/22 |
| 2011/0224879 A1* | 9/2011 | Waku et al. | 701/67 |
| 2012/0063920 A1* | 3/2012 | Ikeda | 417/32 |
| 2012/0108385 A1* | 5/2012 | Sano et al. | 477/5 |
| 2012/0209495 A1* | 8/2012 | Sakai et al. | 701/102 |
| 2012/0244012 A1* | 9/2012 | Kigure | 417/32 |

* cited by examiner

APPARATUS AND METHOD FOR CONTROLLING ELECTRIC OIL PUMP

BACKGROUND OF THE INVENTION

1. Field of the Invention

The present invention relates to an apparatus and a method for controlling an electric oil pump for a vehicle, and in particular, relates to a control apparatus and a control method for operation preparation of an electric oil pump.

2. Description of Related Art

A conventional electric oil pump is provided in parallel with a mechanical oil pump driven by an internal combustion engine serving as a power source of a vehicle, to supply oil to a transmission of the vehicle, and the electric oil pump supplies oil for lubrication and cooling to at least a part (a clutch) of the transmission when operation request to the electric oil pump is received (see Japanese Laid-Open Patent Application Publication No. 2007-320353).

SUMMARY OF THE INVENTION

However, in the electric oil pump operated in response to an operation request thereto, during stopping of the electric oil pump, oil in oil pipes controlled by the electric oil pump remains therein, which may cause a situation in which the temperature of the oil is different from a temperature of oil in an oil pan which flows frequently by the mechanical oil pump. In this case, particularly at a very low temperature or the like, when the electric oil pump is operated in response to an operation request thereto, a motor receives an excessive resistance because of a high viscosity of the oil in the oil pipes controlled by the electric oil pump, thereby making it difficult to respond to the operation request in some cases.

Furthermore, it is conceivable that in advance of the operation request to the electric oil pump, the electric oil pump is rotated so as to determine whether or not the rotation at a performance-guaranteed rotational speed (a rotational speed satisfying a performance-guaranteed flow rate) is achieved. However, since the performance-guaranteed rotational speed is a relatively high rotational speed, it is difficult to rotate the electric oil pump at such a level that a rotational speed reaches the performance-guaranteed rotational speed when the temperature is very low, and the time taken before the electric oil pump becomes operable cannot be shortened.

Therefore, in view of the above conventional problems, it is an object of an aspect of the present invention to perform appropriate operation preparation and determination of on operation-preparation completion in advance of an operation request to the electric oil pump, to thereby shorten time for the operation preparation.

In order to achieve the above object, an aspect of the present invention provides a configuration including: an operation preparation and determination mode for rotating an electric oil pump at a second operation-preparation rotational speed in advance of an operation request to the electric oil pump and for determining that operation preparation is completed when an actual rotational speed reaches the second operation-preparation rotational speed; and a low-speed operation preparation mode for rotating the electric oil pump at a first operation-preparation rotational speed which is lower than the second operation-preparation rotational speed under at least one condition that the rotation is performed before it is determined that the operation preparation is completed.

Other objects and features of an aspect of the present invention will be understood from the following description with reference to the accompanying drawings.

DETAILED DESCRIPTION OF THE PREFERRED EMBODIMENTS

Hereinafter, preferred embodiments of the present invention will be described in detail.

Figure 1:
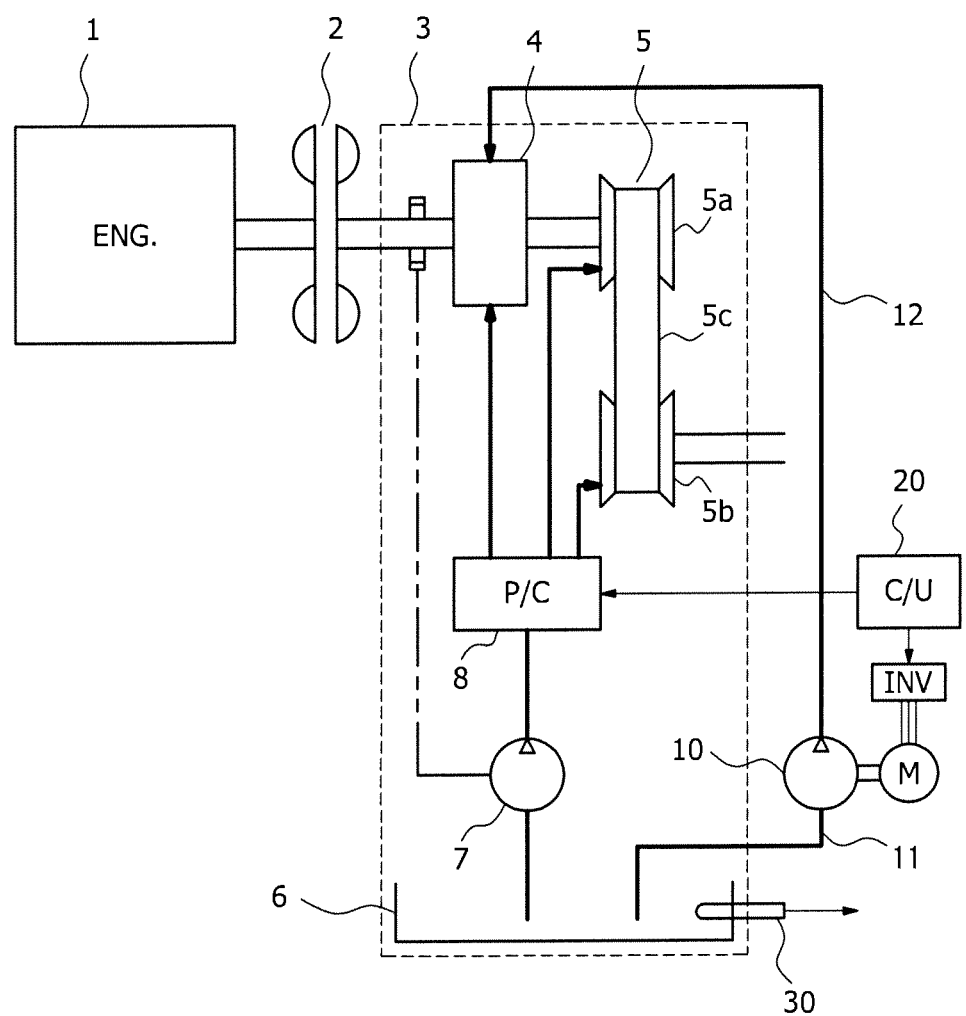
FIG. 1 is a schematic view of an oil supply system in a transmission for a vehicle, which illustrates one embodiment of the present invention.

FIG. 1 is a schematic view of an oil supply system in a transmission for a vehicle, which illustrates one embodiment of the present invention.

An engine (an internal combustion engine) 1 serving as a power source of the present vehicle is equipped with an idle-stop function. Engine 1 is stopped automatically by stopping fuel supply to engine 1 under a predetermined idle-stop condition, and subsequently, when an idle-stop release condition is established, engine 1 is restarted by restarting the fuel supply to engine 1 again.

An output shaft of this engine 1 is connected to a transmission 3 through a torque converter 2.

Transmission 3 is configured to include a clutch 4 and a continuously variable transmission 5.

Clutch 4 is constituted by a multiplate wet clutch, and coupling and uncoupling thereof is controlled by oil pressure control of hydraulic oil.

Note that clutch 4 as used herein is, more specifically, friction engagement elements in a forward-reverse switching mechanism. The forward-reverse switching mechanism is configured to include, for example: a ring gear connected to an engine output shaft; a planetary gear mechanism including pinions, a pinion carrier, and a sun gear connected to a transmission input shaft; a reverse brake for fixing a transmission case to the pinion carrier; and a forward clutch which connects the transmission input shaft and the pinion carrier. The forward-reverse switching mechanism switches between forward travel and reverse travel of a vehicle. In this case, the forward clutch and the reverse brake which are friction engagement elements in the forward-reverse switching mechanism correspond to clutch 4.

Continuously variable transmission 5 includes a primary pulley 5a, a secondary pulley 5b, and a belt 5c which runs around these pulleys. The rotation of primary pulley 5a is transmitted to secondary pulley 5b through belt 5c, and the rotation of secondary pulley 5b is transmitted to a driving-wheel (not shown).

In this continuously variable transmission 5, a movable conical plate of primary pulley 5a and a movable conical plate of secondary pulley 5b are displaced in an axial direction by controlling oil pressures of respective hydraulic oil so as to change the radius at a contact position of each pulley 5a, 5b with belt 5c, thereby changing a pulley ratio (a rotation ratio) between primary pulley 5a and secondary pulley 5b, so that a transmission gear ratio can be changed continuously.

Oil is stored in an oil pan 6 at a case bottom of transmission 3. This oil is drawn by a mechanical oil pump 7 to be pressurized, and is supplied as hydraulic oil to respective hydraulic actuators of clutch 4 and pulleys 5a, 5b through a pressure control mechanism 8.

Mechanical oil pump 7 is provided within the case of transmission 3, and is driven by an input shaft of transmission 3. Accordingly, mechanical oil pump 7 is substantially driven by engine 1 serving as a power source.

Pressure control mechanism 8 includes electromagnetic valves having a relief function for respective parts (clutch 4 and pulleys 5a, 5b) to be supplied with oil, to supply oil to the respective parts to be supplied with oil by adjusting a discharge pressure of mechanical oil pump 7 to target pressures of the respective parts to be supplied with oil under control of a control unit 20 configured to include a microcomputer. Hereby, the switching between forward travel and reverse travel of a vehicle and the control of the transmission gear ratio are performed.

Mechanical oil pump 7 supplies oil as hydraulic oil to clutch 4 and pulleys 5a, 5b through pressure control mechanism 8, and also supplies oil for lubrication and cooling to each part in transmission 3. The supplied oil is returned to oil pan 6 to be circulated.

On the other hand, an electric oil pump 10 driven by engine 1 serving as a power source is provided in parallel with mechanical oil pump 7.

Electric oil pump 10 is provided to supply cooling oil to clutch 4 so as to reduce generation of frictional heat in clutch 4 during stopping of engine 1, that is, during stopping of mechanical oil pump 7.

Figure 2:
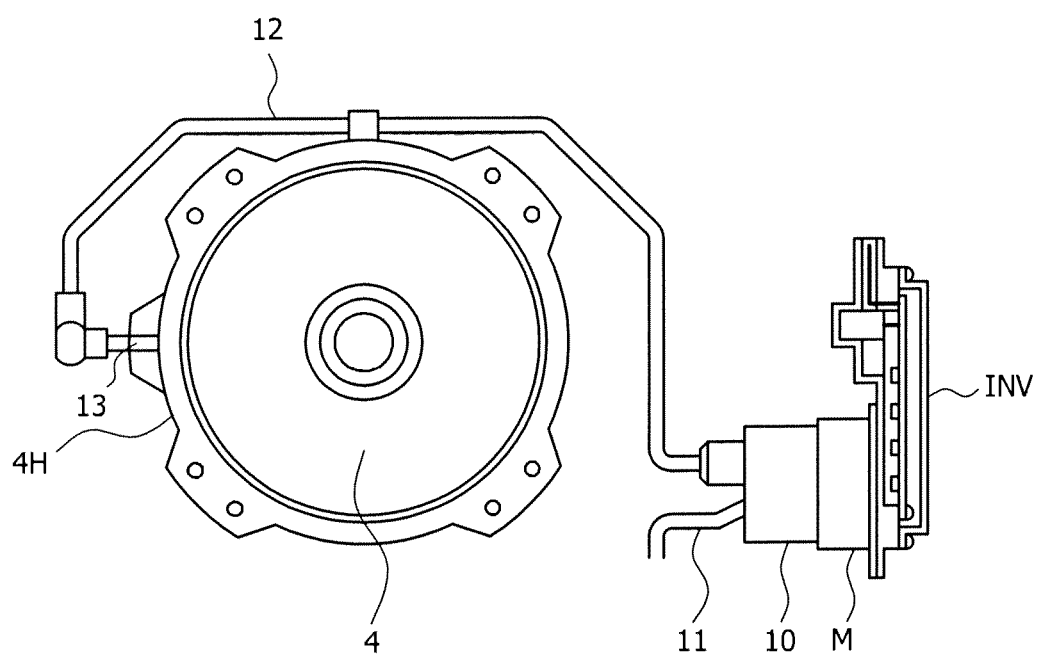
FIG. 2 is a schematic view illustrating an electric oil pump and an example of arrangement of an electric oil pump and oil pipes.

FIG. 2 illustrates an example of arrangement of the electric oil pump and oil pipes. Hereinbelow, the explanation is given with reference to FIGS. 1 and 2.

Electric oil pump 10 is configured to include a pump section (10), a motor M for driving the pump section, and an inverter INV for performing a PWM control on motor M under control of control unit 20.

This electric oil pump 10 is provided outside the case of transmission 3, and draws oil from oil pan 6 at the case bottom through a drawing pipe 11 and supplies cooling oil to clutch 4 in the case through a discharge pipe 12. Thus, discharge pipe 12 is provided to run around the case of transmission 3, that is, around a housing 4H of clutch 4 to be connected to an oil inlet 13 formed on housing 4H.

Within housing 4H, an oil passage (not shown) which leads oil from oil inlet 13 to a center portion of the housing is provided, and the oil supplied to the center portion of the housing is supplied to each part with centrifugal force.

Figure 3:
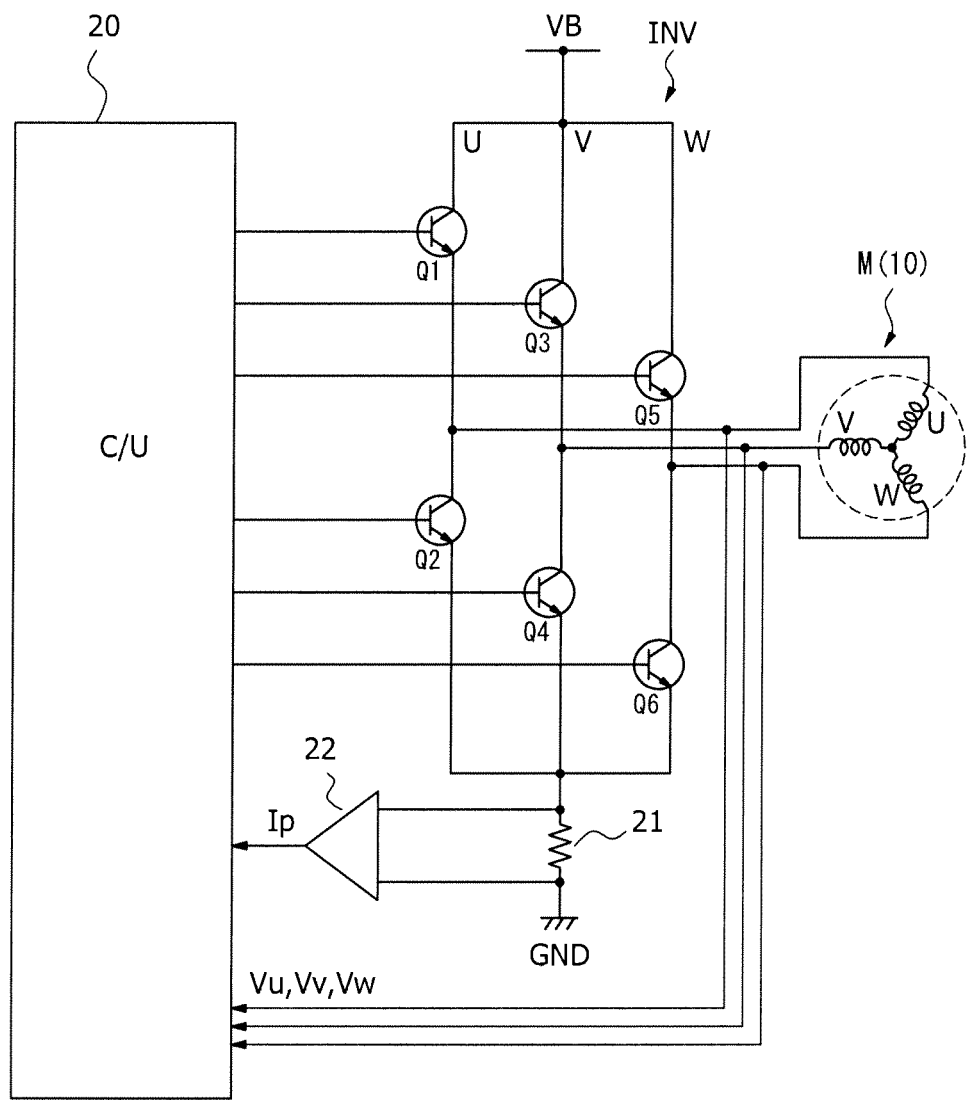
FIG. 3 is a circuit diagram of a motor and an inverter constituting an electric oil pump.

FIG. 3 illustrates circuit diagram of motor M and inverter INV constituting electric oil pump 10.

As motor M, a three-phase brushless motor is used. This is constituted by an inner rotor which is attached to a rotary shaft and into which a plurality of permanent magnets are embedded and an outer stator of wound three-phase (U phase, V phase, W phase) coils, and rotates the rotor in a magnetic field by a current to be supplied to the coils on the stator side. Motor M is simplified in FIG. 3 and illustrated with the coils of the U phase, the V phase, and the W phase.

Inverter INV converts a power-supply voltage (direct voltage) into an alternating voltage by a PWM control (control to generate a voltage of which a pulse width is modulated at a constant cycle to obtain a sine wave in a pseudo manner) and supplies the alternating voltage to motor M. Inverter INV includes a U-phase arm, a V-phase arm, and a W-phase arm in parallel between a side of a power supply VB and a side of a ground GND.

The U-phase arm includes two switching elements Q1, Q2, in series. The V-phase arm also includes two switching elements Q3, Q4, in series. Furthermore, the W-phase arm includes two switching elements Q5, Q6, in series.

Each of the U-, V-, and W-phase arms has an intermediate point connected to one end of a corresponding one of the U-, V-, and W-phase coils which are star-connected with each other at another ends thereof in motor M. That is, an intermediate point between switching elements Q1, Q2 of the U-phase arm is connected to the U-phase coil, an intermediate point between switching elements Q3, Q4 of the V-phase arm is connected to the V-phase coil, and an intermediate point between switching elements Q5, Q6 of the W-phase arm is connected to the W phase coil.

Thus, in accordance with a sinusoidal voltage to each of the U, V, and W phases, control unit 20 serving as a core of the control apparatus controls a ratio of an ON period of a switching element of each phase arm on the side of power supply VB to an ON period of the other switching element thereof on the side of ground GND to obtain a pseudo alternating voltage, thereby making it possible to drive motor M.

Note that, in order to control the drive of motor M, control unit 20 receives, through a detector 22, a potential difference $\Delta V$ between both ends of a current detecting resistor (a resistance value R) 21 provided on a common line of the U-, V-, and W-phase arms on the side of ground GND. A pump current $Ip = \Delta V/R$ is detected based on the potential difference $\Delta V$. Furthermore, potentials Vu, Vv, and Vw of the respective intermediate points of the U-, V-, and W-phase arms are also detected and input therein.

In the oil supply system of the transmission for a vehicle as described above, oil is supplied to each part in transmission 3 by mechanical oil pump 7 during operation of engine 1. If necessary, an operation request is sent to electric oil pump 10, so that cooling oil is supplied to clutch 4 by electric oil pump 10, thereby preventing heat generation of clutch 4.

An operation request is sent to electric oil pump 10 in the case in which:

(1) engine 1 is stopped under an idle-stop condition, mechanical oil pump 7 is stopped in response to this engine stopping;

(2) regardless of operation and stopping of mechanical oil pump 7, clutch 4 is operated at the time of starting a vehicle (in particular, clutch 4 slips to provide engagement), that is, a high cooling performance for cooling clutch 4 is required).

This electric oil pump 10 has a performance-guaranteed oil temperature (for example, −25° C. (degrees Celsius)), and its performance is guaranteed at oil temperatures higher than this temperature. In view of this, at temperatures less than the performance-guaranteed oil temperature, it is preferable to prohibit idle stop or starting of a vehicle so that no operation request is sent to electric oil pump 10.

As a detection device of the oil temperature, an oil-temperature sensor 30 (see FIG. 1) is usually provided within oil pan 6.

However, oil temperatures in the oil pipes (drawing pipe 11 and discharge pipe 12) controlled by electric oil pump 10 may be greatly different from the oil temperature in oil pan 6.

This is because during stopping of electric oil pump 10, oils in oil pipes 11, 12 controlled by electric oil pump 10 remain therein, which results in that the oil temperatures in oil pipes 11, 12 are different from the oil temperature in oil pan 6 in which oil frequently flows by mechanical oil pump 7.

In addition, electric oil pump 10 in the present embodiment is provided outside the case of transmission 3 and oil pipes 11, 12 controlled by electric oil pump 10 are provided to run around the outside of the case of transmission 3. Thus, even if the inside of the case of transmission 3 is warmed along with progress of warming up of engine 1 and transmission 3, electric oil pump 10 and oil pipes 11, 12 are exposed to outer air, so that they stay put in an environment of a very low temperature in cold areas in the winter season.

Accordingly, when a first pump operation request is sent during the warming up after start-up in cold districts in the winter season, viscosities of the oils in oil pipes 11, 12 controlled by electric oil pump 10 are high, which causes motor M to receive an excessive load, thereby resulting in electric oil pump 10 being unable to respond to the operation request in some cases.

Therefore, when the operation request is sent to electric oil pump 10, in order to reliably guarantee the operation at a general rotational speed, operation preparation of electric oil pump 10 is performed in advance of the operation request.

First, electric oil pump 10 is rotated at a first operation-preparation rotational speed which is a very low speed for a predetermined time (a low-speed operation preparation mode). That is, electric oil pump 10 is rotated with time at a very low speed so as not to receive an excessive load, and a relatively-warm oil in oil pan 6 flows into oil pipes 11, 12 to replace oils in oil pipes 11, 12, thereby increasing the oil temperatures in oil pipes 11, 12.

The first operation-preparation rotational speed here is set in conformity with the predetermined time (rotation time) so that a necessary flow rate to replace the oils in the pipes is obtained. The time is longer as the rotational speed is lower, but a pump current decreases, so that a load can be reduced. Thus, it is necessary to determine the first operation-preparation rotational speed with balance between the time and the load. Furthermore, as electric oil pump 10, there are one having a minimum pump clearance and one with a maximum pump clearance (with small friction) within a range of the pump clearance. In view of this, in a case in which the replacement time of the oils is taken into consideration, the first operation-preparation rotational speed is determined on the basis of the one with a maximum pump clearance (maximum leak), so that the replacement of the oils can be performed thoroughly. On the other hand, in a case in which the load is taken into consideration, the first operation-preparation rotational speed is determined on the basis of the one with a minimum pump clearance (with large friction), so that it can be set to be safer.

Subsequently, in order to determine that the operation preparation is completed by the replacement of the oils, electric oil pump 10 is rotated at a second operation-preparation rotational speed which is a relatively high speed, and when an actual rotational speed reaches the second operation-preparation rotational speed, it is determined that the operation preparation is completed (an operation preparation and determination mode). Then, the operation of electric oil pump 10 is to be permitted after it is determined that the operation preparation is completed.

Note that the low-speed operation preparation mode and the operation preparation and determination mode are basically performed in such an order of (1) the low-speed operation preparation mode and (2) the operation preparation and determination mode (2), and if it is determined that the operation preparation is not completed, these modes are repeated in the order of (1) and (2). However, in a case of not being in a cold state (in a case of a warm-up completion state), the relatively high-speed operation preparation and determination mode may be performed first, and if it is determined that the operation preparation is not completed, the low-speed operation preparation mode may be performed, followed by performing the operation preparation and determination mode again. Alternatively, regardless of the cooling state or the warm-up completion state, shortening of the time may be prioritized such that the relatively high-speed operation preparation and determination mode is performed first, and if it is determined that the operation preparation is not completed, the low-speed operation preparation mode is performed, followed by performing the operation preparation and determination mode again.

The following describes a routine of the operation preparation of electric oil pump 10 performed by control unit 20 with reference to a flowchart. Note that a low-speed operation preparation mode section and an operation preparation and determination mode section are provided in control unit 20 as software.

Figure 4:
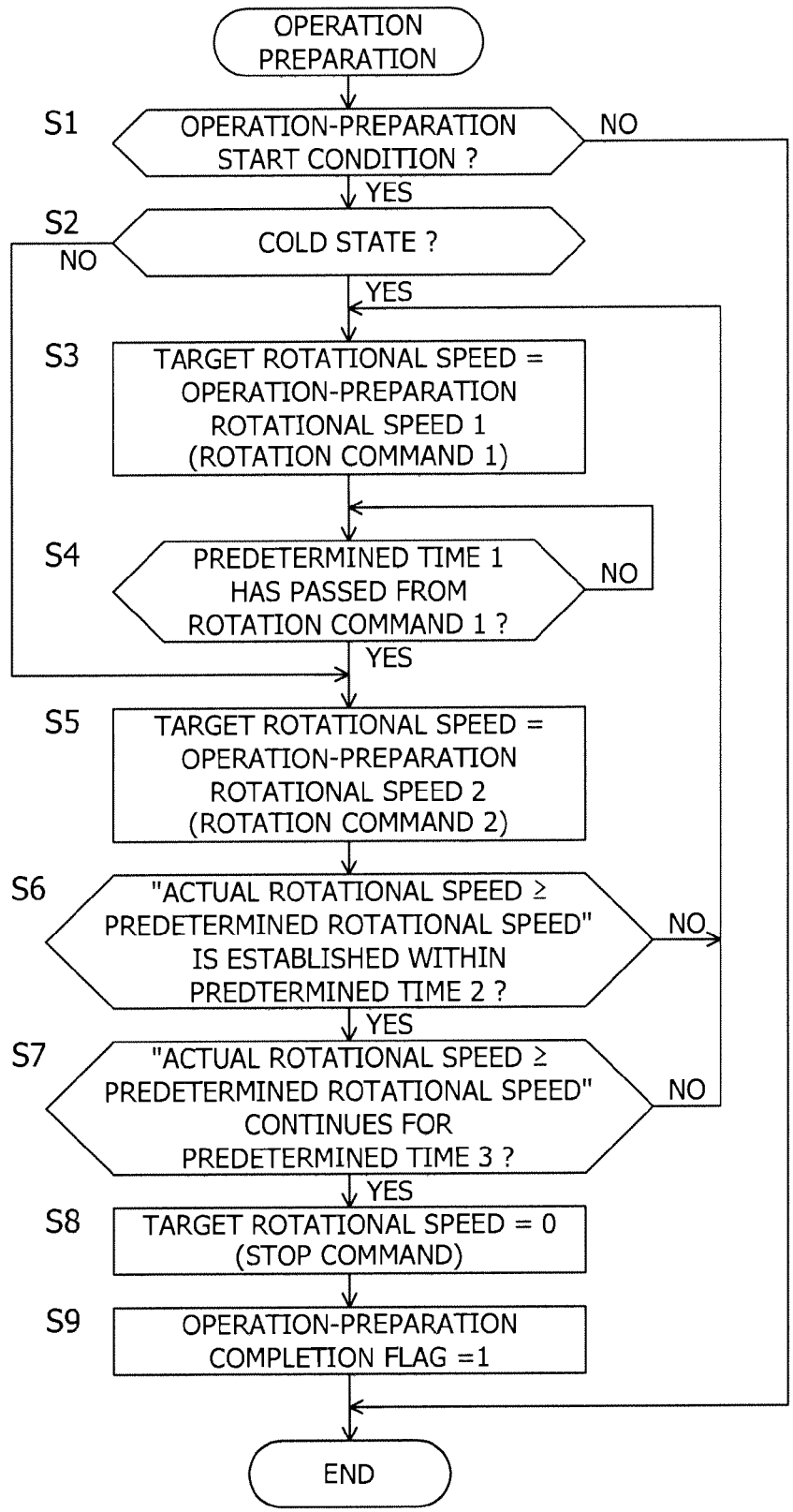
FIG. 4 is a flowchart of a routine of operation preparation of an electric oil pump in the first embodiment.
Figure 5:
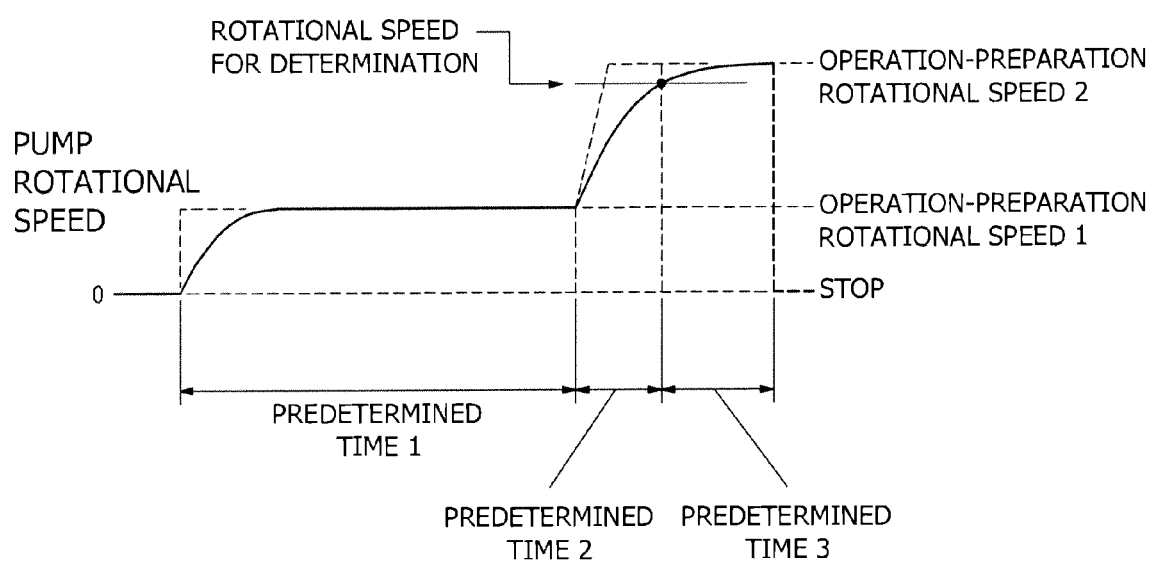
FIG. 5 is a view illustrating behavior of a pump rotational speed at the time of operation preparation in the first embodiment.

FIG. 4 is a flowchart of a routine of the operation preparation of electric oil pump 10 in the first embodiment. This routine is performed just after power is turned on, and subsequently performed every predetermined time. However, this routine is a time interrupt routine and may be executed in the case in which the present oil temperature is higher than the initial oil temperature (after an increase in the oil temperature is ascertained) (the same will be applied to the following flowchart of a second to a sixth embodiments of the present application). Furthermore, FIG. 5 illustrates behavior of a pump rotational speed at the time of the operation preparation in the first embodiment, and will be also referred to.

In S1, it is determined whether or not a predetermined operation-preparation start condition is established. The operation-preparation start condition as used herein basically indicates a case in which it is just after power is turned on and the operation preparation of electric oil pump 10 is not completed (in a case of an operation-preparation completion flag=0). In addition to that, the following cases are included: a case in which the operation-preparation completion flag indicates 1, but after the previous operation preparation is completed, at least a predetermined time passes without any operation request to electric oil pump 10; and a case in which after the previous operation request is sent to electric oil pump 10, at least a predetermined time passes and an outdoor temperature detected by an outdoor temperature sensor has a predetermined value or less.

Furthermore, the operation-preparation start condition at a very low temperature is defined as follows. That is, in a case in which an oil temperature detected by oil-temperature sensor 30 in oil pan 6 is lower than the performance-guaranteed oil temperature (for example, −25° C.) of electric oil pump 10 (for example, in the case of −30° C.), an increase in the oil temperature due to start of engine rotation (rotation of the input shaft of transmission 3) or an increase in the oil temperature due to an oil warmer using engine cooling water is ascertained, and when the oil temperature reaches a predetermined temperature (for example, −27° C. to −28° C.) that is lower than the performance-guaranteed oil temperature, it is assumed that the operation-preparation start condition is established.

When such an operation-preparation start condition is established, the operation-preparation completion flag is reset as need, and the process proceeds to S2 for operation preparation. When the operation-preparation start condition is not established, the process is finished.

In S2, it is determined whether transmission 3 is in a cold state or not (whether transmission 3 is in a state in which warm-up is not completed). This is performed by comparing the oil temperature detected by oil-temperature sensor 30 in oil pan 6 with a predetermined value. In this determination, in a case of the cold state, the process proceeds to S3, and in a case of not being in the cold state, the process proceeds to S5. This is because in the case of the cold state, (1) the low-speed operation preparation mode (S3, S4) and (2) the operation preparation and determination mode (S5 to S7) are performed in this order, and in the case of not being in the cold state, the operation preparation and determination mode (S5 to S7) is performed first.

Hereinbelow is a description of the operation preparation performed in the order of (1) the low-speed operation preparation mode (S3, S4) and (2) the operation preparation and determination mode (S5 to S7) in the case of the cold state.

In S3, a target rotational speed of electric oil pump 10 is set to a first operation-preparation rotational speed (an operation-preparation rotational speed 1), and a rotation command 1 is sent. The first operation-preparation rotational speed is a rotational speed which is sufficiently lower than the after-mentioned second operation-preparation rotational speed (which is set to at least a rotational speed that satisfies the performance-guaranteed flow rate), and is 500 rpm, for example.

In S4, it is determined whether or not a predetermined time (for example, 15 seconds) has passed from the time when rotation command 1 is sent, and at the time when the predetermined time has passed, the process proceeds to S5.

In S5, the target rotational speed of electric oil pump 10 is set to a second operation-preparation rotational speed (an operation-preparation rotational speed 2), and a rotation command 2 is sent. The second operation-preparation rotational speed is set to at least a rotational speed that satisfies the performance-guaranteed flow rate, and is sufficiently higher than the first operation-preparation rotational speed. The second operation-preparation rotational speed is, for example, 1200 rpm.

In S6, it is determined whether or not "actual rotational speed≥(is greater than or equal to) predetermined rotational speed" is established within a predetermined time 2 from the time when rotation command 2 is sent. The predetermined rotational speed here is a rotational speed which is close to the second operation-preparation rotational speed and which satisfies the performance-guaranteed flow rate. In this determination, when "actual rotational speed≥(is greater than or equal to) predetermined rotational speed" is established within predetermined time 2, the process proceeds to S7 at this time, but when "actual rotational speed≥(is greater than or equal to) predetermined rotational speed" is not established even after predetermined time 2 has passed, the process returns to S3 at this time.

In S7, after "actual rotational speed≥(is greater than or equal to) predetermined rotational speed" has been established, it is determined whether or not this state has continued for a predetermined time 3. In this determination, when "actual rotational speed≥(is greater than or equal to) predetermined rotational speed" has continued for predetermined time 3, the process proceeds to S8 at this time, but when "actual rotational speed≥(is greater than or equal to) predetermined rotational speed" has not been able to continue, the process returns to S3 at the time when the actual rotational speed falls below the predetermined rotational speed.

Thus, in the case in which, after rotation command 2 is sent at the second operation-preparation rotational speed, in S6 and S7, the actual rotational speed reaches the predetermined rotational speed which is close to the second operation-preparation rotational speed within predetermined time 2 and the state of "actual rotational speed≥(is greater than or equal to) predetermined rotational speed" has continued for predetermined time 3, it is considered that the second operation-preparation rotational speed is satisfied, and the process proceeds to S8 and S9.

In S8, the target rotational speed is set to 0 to finish the operation preparation process, and a stop command is sent.

In S9, it is determined that the operation preparation is completed, and the operation-preparation completion flag is set to 1. By setting the operation-preparation completion flag as such, a normal operation of electric oil pump 10 is permitted. Thus, idle stop of engine 1 or starting of a vehicle is also permitted.

On the other hand, when "actual rotational speed≥(is greater than or equal to) predetermined rotational speed" is not established even after predetermined time 2 has passed in the determination of S6, or when "actual rotational speed≥(is greater than or equal to) predetermined rotational speed" has not been able to continue for predetermined time 3 in the determination in S7, the process returns to S3, S4. That is, the low-speed operation preparation mode at the first operation-preparation rotational speed on the low-speed side (S3, S4) is retried. Thereafter, the operation preparation and determination mode at the second operation-preparation rotational speed on the high-speed side (S5 to S7) is retried.

Hereinbelow is a description of operation preparation in which the operation preparation and determination mode (S5 to S7) in a case of the warm-up completion state is performed first.

In the case of the warm-up completion state, the process proceeds to S5 in the determination in S2, and the operation preparation and determination mode (S5 to S7) at the second operation-preparation rotational speed on the high-speed side is performed first. When it is determined that the operation preparation is completed in this operation preparation and determination mode, the operation preparation is finished (S8), and the operation-preparation completion flag is set (S9). Thus, in this case, the low-speed operation preparation mode (S3, S4) at the first operation-preparation rotational speed on the low-speed side can be omitted, whereby time for the operation preparation can be largely shortened.

When it is determined that the operation preparation is not completed in the operation preparation and determination mode (S5 to S7) (in a case of No in S6 or S7), the low-speed operation preparation mode (S3, S4) at the first operation-preparation rotational speed on the low-speed side is performed. Thereafter, the operation preparation and determination mode (S5 to S7) at the second operation-preparation rotational speed on the high-speed side is retried.

Figure 6:
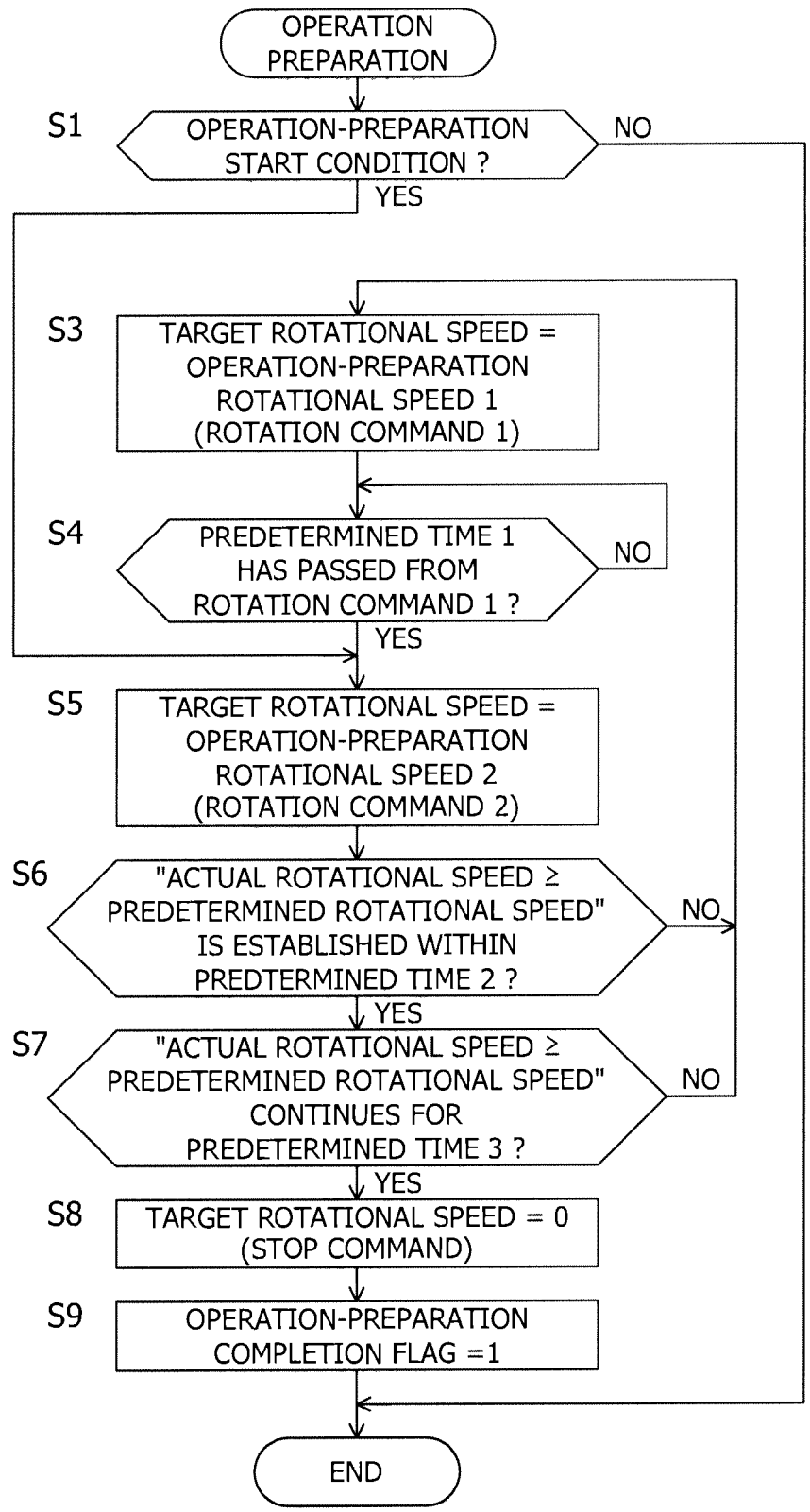
FIG. 6 is a flowchart of a routine of operation preparation of an electric oil pump in the second embodiment.

FIG. 6 is a flowchart of a routine of operation preparation of electric oil pump 10 in the second embodiment. This routine is also performed just after power is turned on, and subsequently performed every predetermined time.

In the flowchart of FIG. 6, the same step as in the flowchart of FIG. 4 is referred to by the same reference sign, and hereinbelow is the description of a different point.

When an operation-preparation start condition is established in determination in S1, the process proceeds to S5 regardless of a cold state or a warm-up completion state (S2 in the flowchart of FIG. 4 is omitted). That is, an operation preparation and determination mode (S5 to S7) at a second operation-preparation rotational speed on a high-speed side is performed first.

When it is determined that the operation preparation is completed in this operation preparation and determination mode, the operation preparation is finished (S8), and an operation-preparation completion flag is set (S9). Thus, in this case, a low-speed operation preparation mode (S3, S4) at a first operation-preparation rotational speed on a low-speed side can be omitted, whereby time for the operation preparation can be largely shortened.

When it is determined that the operation preparation is not completed in the operation preparation and determination mode (S5 to S7) (in a case of No in S6 or S7), the low-speed operation preparation mode (S3, S4) at the first operation-preparation rotational speed on the low-speed side is performed. Thereafter, the operation preparation and determination mode (S5 to S7) at the second operation-preparation rotational speed on the high-speed side is retried.

Note that when a fail signal is generated in a system of electric oil pump 10 during the operation preparation (during the low-speed operation preparation mode and the operation preparation and determination mode), the operation preparation is forcibly terminated, which is omitted in the flowchart (FIG. 4 or FIG. 6). Furthermore, in a case in which the operation preparation driving is repeated to heat up electric oil pump 10 by heat generation and an excessively high temperature is detected, electric oil pump 10 enters in a protection state so as to stop electric oil pump 10 so that its temperature is decreased. When the temperature is decreased to a predetermined temperature, the protection state is released. In addition to that, the rotation of electric oil pump 10 for the operation preparation is stopped under various conditions set beforehand, but it is preferable to continue the operation preparation to secure oil supply performance as far as no trouble is caused.

The present embodiment is configured to include: an operation preparation and determination mode (a mode section) for rotating electric oil pump 10 at a second operation-preparation rotational speed in advance of an operation request to electric oil pump 10 and for determining that operation preparation is completed when an actual rotational speed reaches the second operation-preparation rotational speed; and a low-speed operation preparation mode (a mode section) for rotating electric oil pump 10 at a first operation-preparation rotational speed which is lower than the second operation-preparation rotational speed under at least one condition that the rotation is performed before it is determined that the operation preparation is completed. Thus, according to the present embodiment with such a configuration, the following effects (1) and (2) are obtained.

(1) In advance of an operation request to electric oil pump 10, electric oil pump 10 is rotated at the second operation-preparation rotational speed for determination on operation-preparation completion, and when a desired rotation is obtained, it is determined that the operation preparation is completed. Consequently, it is possible to give operation permission to electric oil pump 10 and eventually to give permission for idle stop of engine 1 or starting of the vehicle based on this determination result, thereby achieving control without causing troubles in driving under an excessive resistance.

(2) Before it is determined that the operation preparation is completed, electric oil pump 10 is rotated at the first operation-preparation rotational speed which is lower than the second operation-preparation rotational speed so as to replace oils in oil pipes 11, 12 controlled by electric oil pump 10. Consequently, the temperature can be increased, whereby the determination on operation-preparation completion can be cleared early. This shortens time for the operation preparation, thereby making it possible to respond to a subsequent operation request immediately.

Particularly, as a basic embodiment, the low-speed operation preparation mode and the operation preparation and determination mode are performed in this order, and if it is determined that the operation preparation is not completed, these modes are repeated in order, thereby yielding the following effects.

By performing the low-speed operation preparation mode first, electric oil pump 10 rotates at the first operation-preparation rotational speed which is a very low speed, so that a relatively-warm oil in oil pan 6 is supplied to oil pipes 11, 12 controlled by electric oil pump 10 so as to push out oils remaining in oil pipes 11, 12, so that the oils are replaced.

At this time, electric oil pump 10 is rotated with time at the very low speed, which does not give an excessive load to motor M. Furthermore, even if the operation preparation is performed just after start-up at a very low temperature, such very-low-speed rotation does not require much electrical power consumption.

Moreover, the replacement of the oils increases oil temperatures in oil pipes 11, 12 and decreases the viscosities of the oils, which allows high-speed rotation and decreases the loss of synchronism of the motor. Accordingly, the operation preparation and determination mode can be performed easily, and the determination on operation-preparation completion can be cleared early.

After it is determined that the operation preparation is completed, the operation of electric oil pump 10 at a normal rotational speed is permitted, thereby making it possible to avoid an operation request from being sent to electric oil pump 10 before the operation preparation is completed.

Furthermore, with the use of device (the oil-temperature sensor 30) for detecting a cold state (or a warm-up completion state) of transmission 3, the low-speed operation preparation mode and the operation preparation and determination mode are performed in this order in the cold state, and when it is determined that the operation preparation is not completed, these modes are repeated sequentially. However, in a case of not being in the cold state, the relatively high-speed operation preparation and determination mode is performed first, and if it is determined that the operation preparation is not completed, the low-speed operation preparation mode is performed, followed by performing the operation preparation and determination mode again. According to such a technique, in the case of not being in the cold state (in the case of the warm-up completion state), time for the operation preparation can be surely shortened. On the other hand, in the case of the cold state, since the oil viscosity is high and the pump load is large, it is expected that the second operation-preparation rotational speed (a rotational speed for determination)

in the operation preparation and determination mode cannot be maintained. In view of this, the low-speed operation preparation mode is performed first, so that it is possible to prevent time for the operation preparation from being longer due to retrying of the determination.

Furthermore, regardless of the cold state or the warm-up completion state, the relatively high-speed operation preparation and determination mode is performed first, and if it is determined that the operation preparation is not completed, the low-speed operation preparation mode is performed, followed by performing the operation preparation and determination mode again. That is, the judgment on operation-preparation completion is preferentially performed first. According to such a technique, only when it is difficult to determine that the operation preparation is completed, the low-speed operation preparation mode is performed. Thus, although the control is simple, shortening of time for the operation preparation can be achieved.

Hereinbelow is a description of other embodiments of the present invention.

Figure 7A:
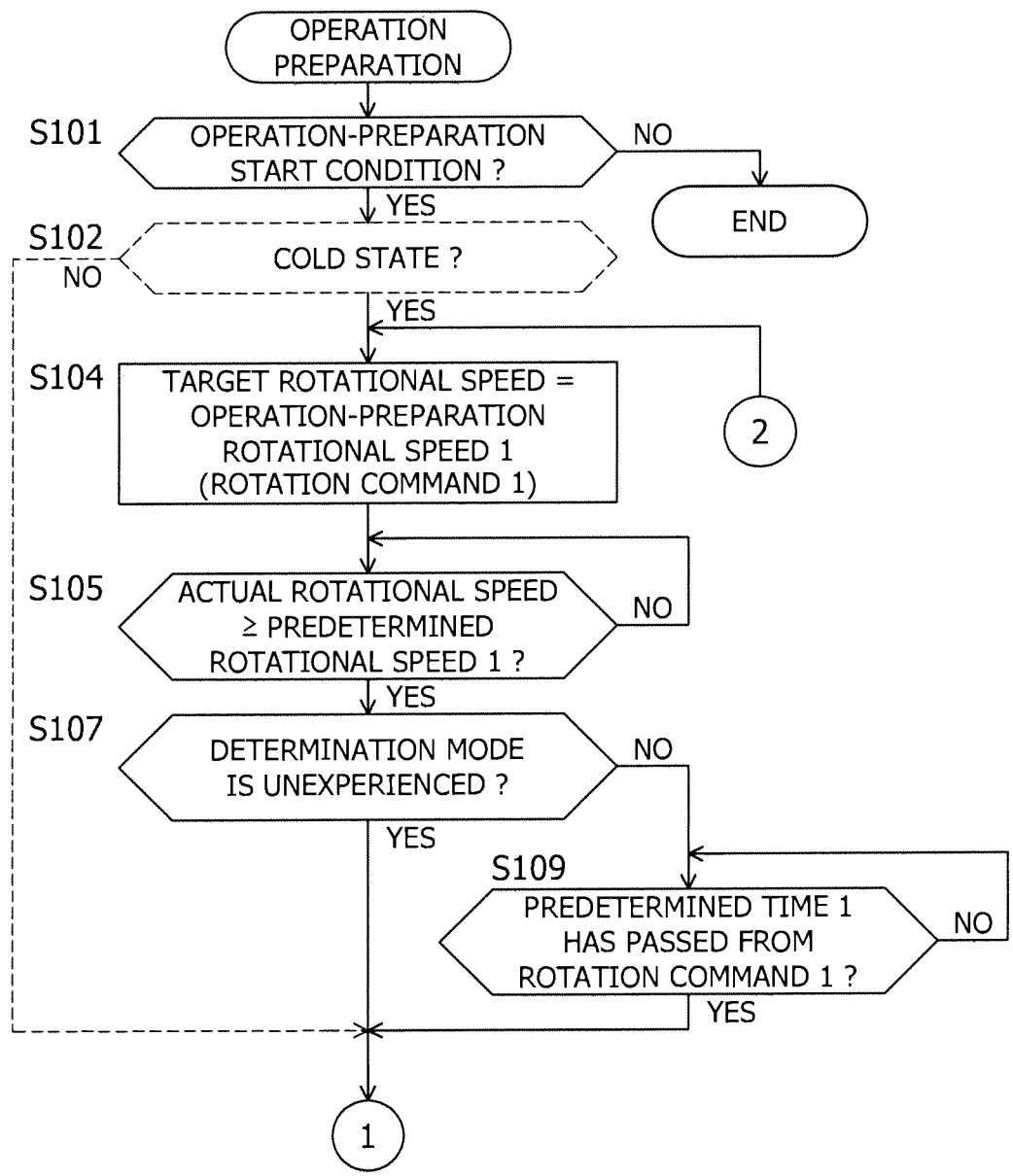
FIG. 7 is a flowchart of a routine of operation preparation of an electric oil pump in the third embodiment.
Figure 7B:
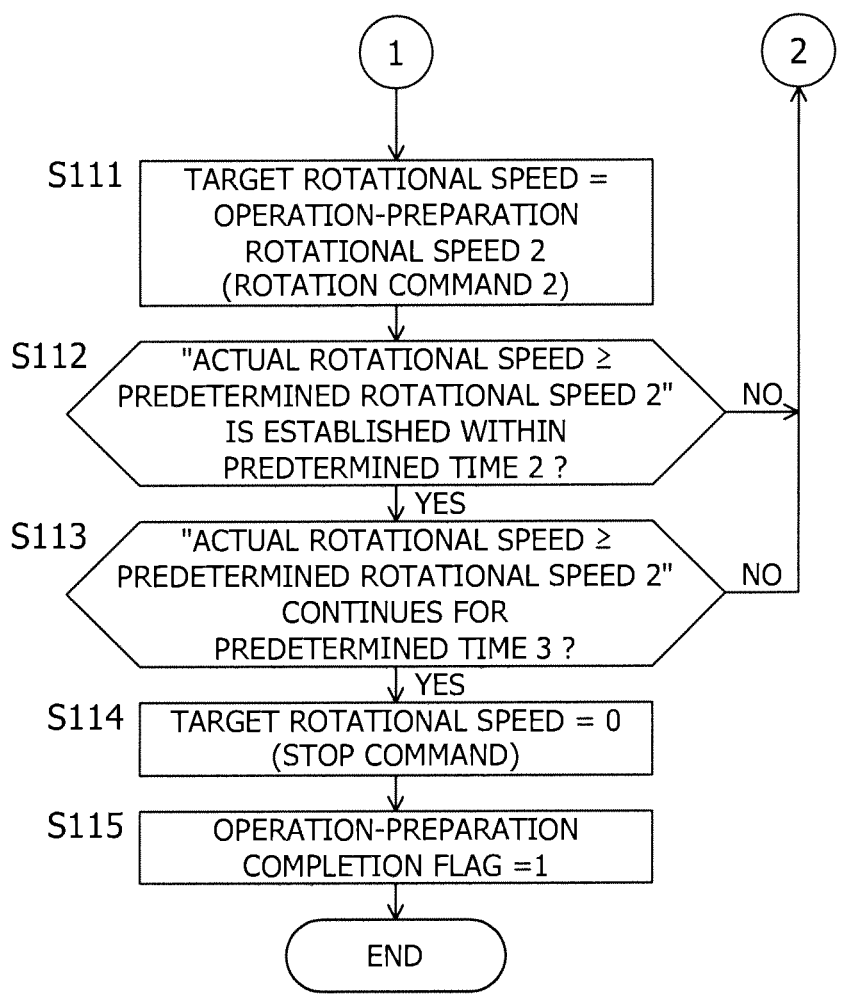
Figure 8:
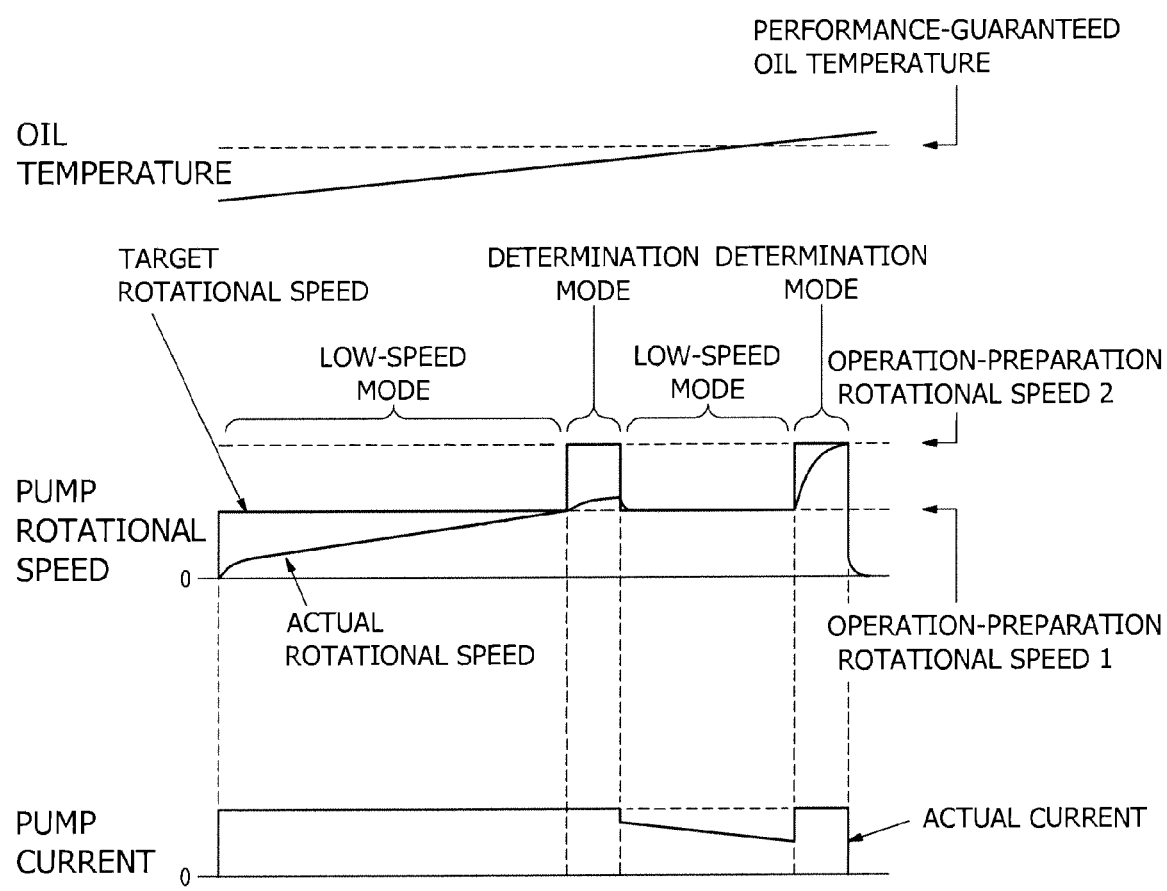
FIG. 8 is a view illustrating behavior such as a pump rotational speed at the time of operation preparation in the third embodiment.

FIG. 7 is a flowchart of a routine of operation preparation of electric oil pump 10 in the third embodiment. This routine is also performed just after power is turned on, and subsequently performed every predetermined time. Furthermore, FIG. 8 illustrates behavior such as a pump rotational speed at the time of operation preparation in the third embodiment, and will be referred to as well.

In S101, it is determined whether or not a predetermined operation-preparation start condition is established. The operation-preparation start condition as used herein basically indicates a case in which it is just after power activation and operation preparation of electric oil pump 10 is not completed (in a case of an operation-preparation completion flag=0). In addition to that, the following cases are included: a case in which the operation-preparation completion flag indicates 1, but after the previous operation preparation is completed, at least a predetermined time passes without any operation request to electric oil pump 10; and a case in which after the previous operation request is sent to electric oil pump 10, at least a predetermined time passes and an outdoor temperature detected by an outdoor temperature sensor has a predetermined value or less.

When such an operation-preparation start condition is established, the operation-preparation completion flag is reset as need, and the process proceeds to S104 for operation preparation. When the operation-preparation start condition is not established, the process is finished. Note that S102 is an omissible process and therefore illustrated with dotted lines, and it will be described later.

In S104, in order to start a low-speed operation preparation mode (abbreviated as a low-speed mode in FIG. 8), a target rotational speed of electric oil pump 10 is set to a first operation-preparation rotational speed (an operation-preparation rotational speed 1), and a rotation command 1 is sent. The first operation-preparation rotational speed is a rotational speed which is sufficiently lower than the after-mentioned second operation-preparation rotational speed (which is set to at least a rotational speed that satisfies a performance-guaranteed flow rate), and is 500 rpm, for example.

In S105, it is determined whether or not "actual rotational speed≥(is greater than or equal to) predetermined rotational speed 1" is established. Predetermined rotational speed 1 here is a rotational speed which is the same as or close to the first operation-preparation rotational speed. In this determination, while the actual rotational speed is less than predetermined rotational speed 1, rotation command 1 is continued, and when "actual rotational speed≥(is greater than or equal to) predetermined rotational speed 1" is established (that is, when the actual rotational speed reaches the first operation-preparation rotational speed), the process proceeds to S107 at this time.

In S107, it is determined whether or not an operation preparation and determination mode (abbreviated as a determination mode in FIG. 8) of S111 to S113 is unexperienced. An experience flag is set by execution of S111 so that the determination may be performed based on a value of this flag, although it is omitted in the flowchart. When the determination mode is unexperienced, the process proceeds to S111 immediately. When the determination mode has been experienced before (when it has failed previously), the process proceeds to S109.

In S109, it is determined whether or not a predetermine time (for example, 15 seconds) has passed from the time when rotation command 1 is sent, and at the time when the predetermined time has passed, the process proceeds to S111.

In S111, in order to start the operation preparation and determination mode, the target rotational speed of electric oil pump 10 is set to a second operation-preparation rotational speed (an operation-preparation rotational speed 2), and a rotation command 2 is sent. The second operation-preparation rotational speed is set to at least a rotational speed that satisfies the performance-guaranteed flow rate. The second operation-preparation rotational speed is a rotational speed which is sufficiently lower than the first operation-preparation rotational speed, and is 1200 rpm, for example.

In S112, it is determined whether or not "actual rotational speed≥(is greater than or equal to) predetermined rotational speed 2" is established within a predetermined time 2 from the time when rotation command 2 is sent. Predetermined rotational speed 2 here is a rotational speed which is the same as or close to the second operation-preparation rotational speed and which satisfies the performance-guaranteed flow rate. In this determination, when "actual rotational speed≥(is greater than or equal to) predetermined rotational speed 2" is established within predetermined time 2, the process proceeds to S113 at this time, and when "actual rotational speed≥ (is greater than or equal to) predetermined rotational speed 2" is not established even after predetermined time 2 has passed, the process returns to S104 at this time.

In S113, after "actual rotational speed≥(is greater than or equal to) predetermined rotational speed 2" is established, it is determined whether or not this state has continued for a predetermined time 3. In this determination, when "actual rotational speed≥(is greater than or equal to) predetermined rotational speed 2" has continued for predetermined time 3, the process progresses to S114 at this time, and when "actual rotational speed≥(is greater than or equal to) predetermined rotational speed 2" has not been able to continue, the process returns to S104 at the time when the actual rotational speed falls below the predetermined rotational speed 2.

Thus, in the case in which, after rotation command 2 is sent at the second operation-preparation rotational speed, in S112 and S113, the actual rotational speed reaches predetermined rotational speed 2 which is close to the second operation rotational speed within predetermined time 2, and the state of "actual rotational speed≥(is greater than or equal to) predetermined rotational speed 2" has continued for predetermined time 3, it is considered that the actual rotational speed reaches the second operation-preparation rotational speed, and the process proceeds to S114 and S115.

In S114, the target rotational speed is set to 0 to finish the operation preparation process, and a stop command is sent.

In S115, it is determined that the operation preparation is completed, and the operation-preparation completion flag is set to 1. By setting the operation-preparation completion flag as such, a normal operation of electric oil pump 10 is permitted. Thus, idle stop of engine 1 or starting of the vehicle is also permitted.

On the other hand, when "actual rotational speed≥(is greater than or equal to) predetermined rotational speed 2" is not established even after predetermined time 2 has passed in the determination of S112, or when "actual rotational speed≥ (is greater than or equal to) predetermined rotational speed 2" has not been able to continue for predetermined time 3 in the determination in S113, the process returns to S104. That is, the low-speed operation preparation mode at the first operation-preparation rotational speed on the low-speed side (S104, S105) is retried. Thereafter, the operation preparation and determination mode at the second operation-preparation rotational speed on the high-speed side (S111 to S113) is retried.

A process of S102 is described below.

In S102, after the operation-preparation start condition is established (S101), it is determined whether transmission 3 is in a cold state or not (whether transmission 3 is in a state in which warm-up is not completed). This is performed by comparing an oil temperature detected by oil-temperature sensor 30 in oil pan 6 with a predetermined value. In this determination, in a case of the cold state, the process proceeds to S104, and in a case of not being in a cold state, the process proceeds to S111. This is because in the case of the cold state, (1) the low-speed operation preparation mode (S104 to S109) and (2) the operation preparation and determination mode (S111 to S113) are performed in this order, and in the case of not being in the cold state, the operation preparation and determination mode (S111 to S113) is performed first.

The present embodiment is configured such that: in the low-speed operation preparation mode, when at least the actual rotational speed reaches the first operation-preparation rotational speed by execution of this mode, the process is allowed to proceed to the operation preparation and determinations mode. Particularly according to the present embodiment thus configured, the following effect is obtained.

During the execution of the low-speed operation preparation mode, the actual rotational speed of electric oil pump 10 is monitored, and the process proceeds to the operation preparation and determination mode at least under a condition that the actual rotational speed reaches the first operation-preparation rotational speed. Accordingly, it is possible to prevent the occurrence of erroneous determination due to the process proceeding to the operation preparation and determination mode even though electric oil pump 10 does not function sufficiently in the low-speed operation preparation mode. Consequently, it is possible to enhance reliability of the determination on operation-preparation completion.

For example, under a condition of an oil temperature of −40° C., even though electric oil pump 10 does not rotate sufficiently, if the process proceeds to the operation preparation and determination mode of a high rotation at the time when a rotation command is being sent for a predetermined time, electric oil pump 10 races without drawing oil, which causes erroneous determination. When the operation preparation is assumed completed according to such erroneous determination, a flow rate is insufficient as compared with a target flow rate. In this regard, if the process proceeds to the operation preparation and determination mode of a high rotation after it is confirmed that the actual rotational speed of electric oil pump 10 reaches the first operation-preparation rotational speed in the low-speed operation preparation mode, it is possible to prevent erroneous determination as much as possible.

Figure 9A:
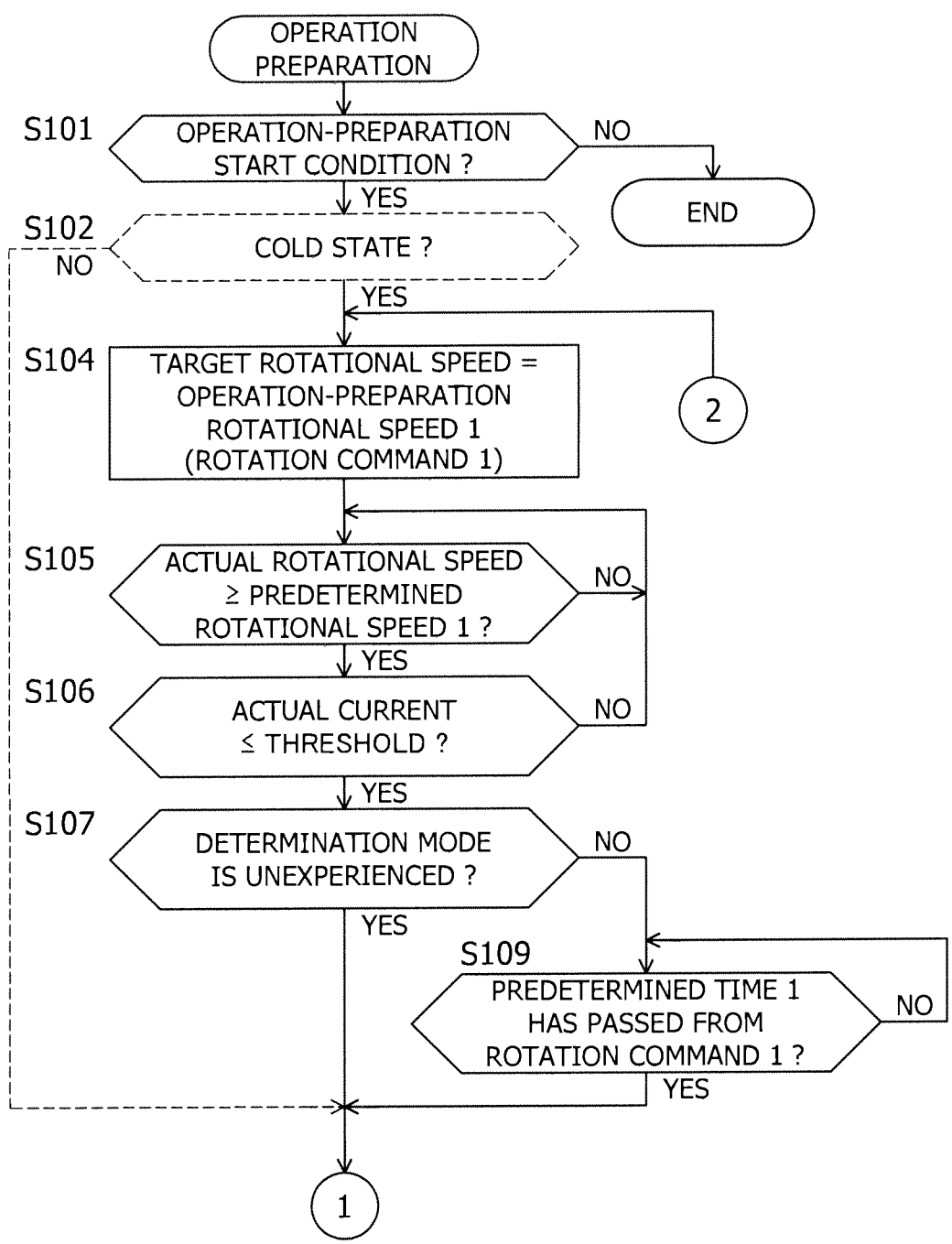
FIG. 9 is a flowchart of a routine of operation preparation of an electric oil pump in the fourth embodiment.
Figure 9B:
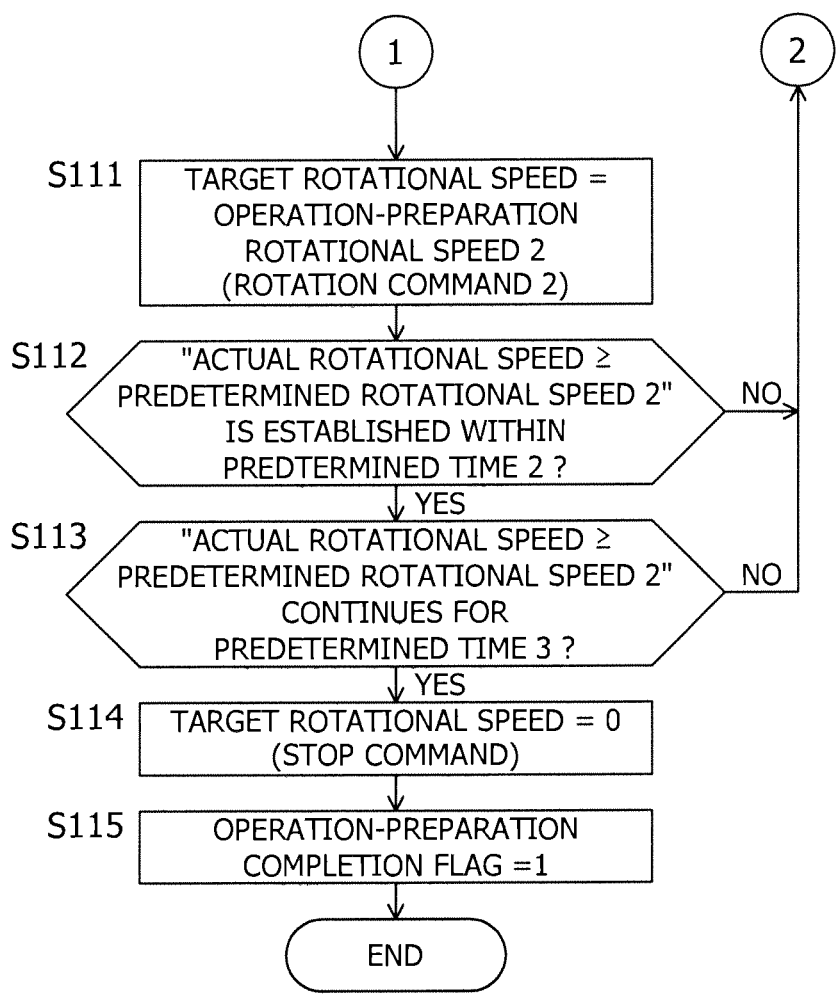
Figure 10:
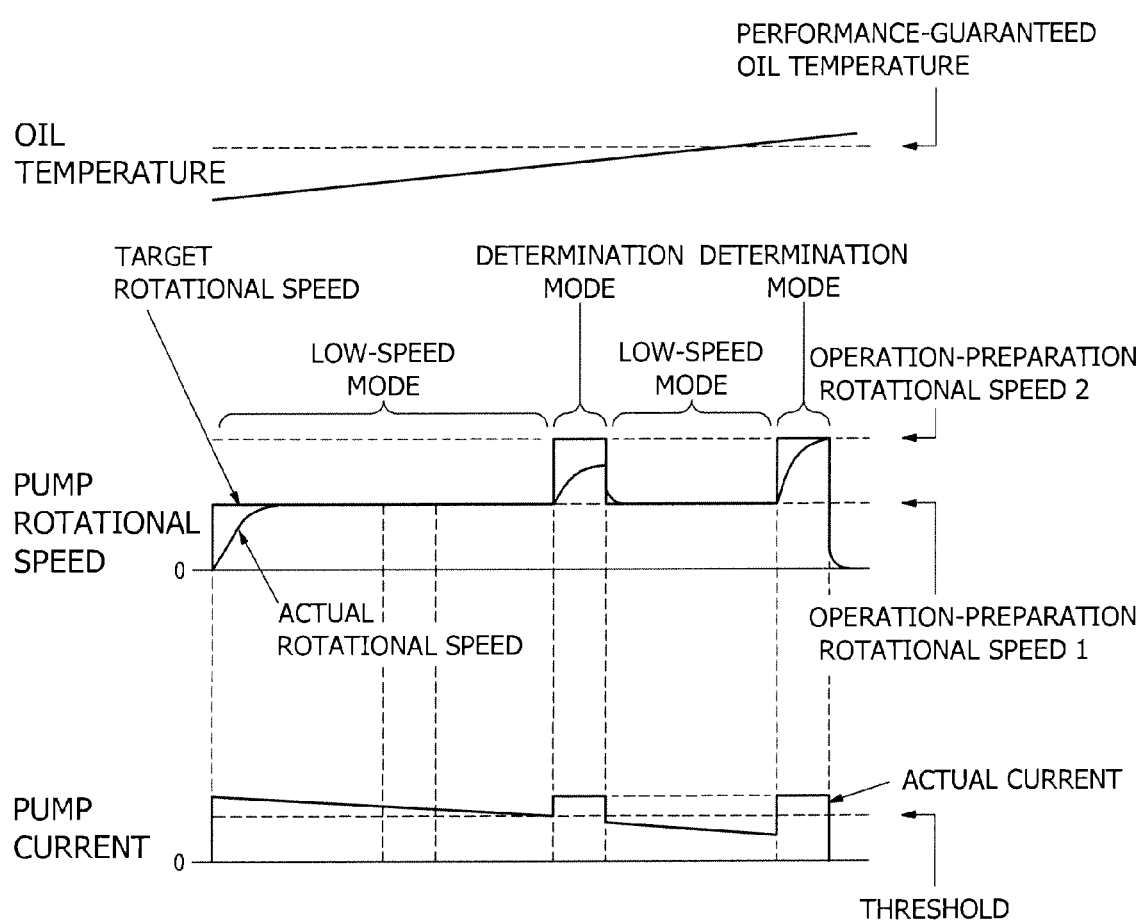
FIG. 10 is a view illustrating behavior such as a pump rotational speed at the time of operation preparation in the fourth embodiment.

FIG. 9 is a flowchart of a routine of operation preparation of electric oil pump 10 in the fourth embodiment. This routine is also performed just after power is turned on, and subsequently performed every predetermined time. Furthermore, FIG. 10 illustrates behavior such as a pump rotational speed at the time of operation preparation in the fourth embodiment, and will be referred to as well.

In the flowchart of FIG. 9, the same step as in the flowchart of FIG. 7 is referred to by the same reference sign, and the following describes a different point. The different point is a low-speed operation preparation mode (S104 to S109), and in particular, adding a process of S106.

In S104, in order to start a low-speed operation preparation mode, a target rotational speed of electric oil pump 10 is set to a first operation-preparation rotational speed (an operation-preparation rotational speed 1), and a rotation command 1 is sent.

In S105, it is determined whether or not "actual rotational speed≥(is greater than or equal to) predetermined rotational speed 1" is established. In this determination, while the actual rotational speed is less than predetermined rotational speed 1, rotation command 1 is continued, and when "actual rotational speed≥(is greater than or equal to) predetermined rotational speed 1" is established (that is, when the actual rotational speed reaches the first operation-preparation rotational speed), the process proceeds to S106 at this time.

In S106, an actual current of electric oil pump 10 is detected, and it is determined whether the current is a predetermined threshold or less. In this determination, while the actual current is larger than the threshold, rotation command 1 is continued, and when "actual current≤(is lower than or equal to) threshold" is established, the process proceeds to S107 at this time.

That is, after rotation command 1 has been sent at the first operation-preparation rotational speed and when the actual rotational speed reaches the second operation-preparation rotational speed and the current of electric oil pump 10 decreases to the predetermined threshold or less, the process proceeds to S107.

In S107, it is determined whether or not an operation preparation and determination mode is unexperienced. When the determination mode is unexperienced, the process proceeds to S111 (the operation preparation and determination mode) immediately. When the determination mode has been experienced before, the process proceeds to S109.

In S109, it is determined whether or not a predetermine time (for example, 15 seconds) has passed from the time when rotation command 1 is sent, and at the time when the predetermined time has passed, the process proceeds to S111 (the operation preparation and determination mode).

The present embodiment is configured such that: in the low-speed operation preparation mode, when the actual rotational speed of electric oil pump 10 reaches the first operation-preparation rotational speed and the actual current of electric oil pump 10 decreases to a predetermined threshold or less by execution of this mode, the process is allowed to proceed to the operation preparation and determination mode. Particularly according to the present embodiment thus configured, the following effect is obtained.

Figure 15:
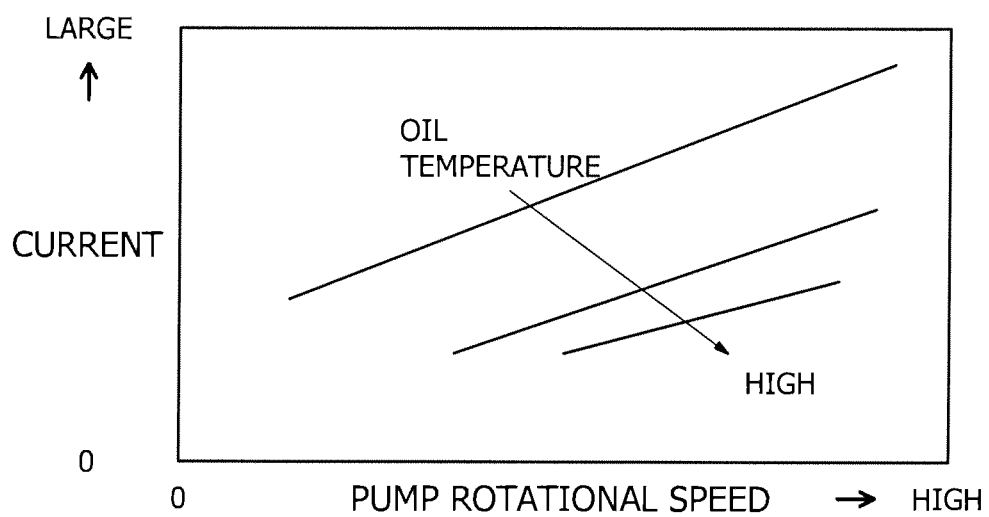
FIG. 15 is a characteristic view of pump current.

FIG. 15 illustrates characteristics of the pump current (motor current of an electric oil pump). As illustrated in FIG. 15, the pump current becomes larger as the pump rotational speed increases, whereas the pump current decreases as a load decreases according to an increase in oil temperature. Accordingly, if the pump rotational speed is constant (for example, the first operation-preparation rotational speed), a load decreases according to the increase in oil temperature, thereby decreasing the pump current. On this account, by decreasing the pump current to a predetermined threshold or less, it can be considered that electric oil pump 10 has enough power to clear the operation preparation and determination mode of a high rotation.

Thus, not only the rotational speed of electric oil pump 10 is monitored, but also the current thereof is monitored so as to check whether electric oil pump 10 has enough power, and in such a state in which electric oil pump 10 has enough power, the process is allowed to proceed to the operation preparation and determination mode of a high rotation. This makes it possible to enhance reliability of the determination on operation-preparation completion.

Furthermore, when the pump current is equal to the threshold, the oil temperature is equal to a predetermined value. Accordingly, if the threshold of the pump current is set so as to correspond to a target temperature (for example, −25° C. of the performance-guaranteed oil temperature), then it is possible to precisely detect the target temperature being achieved by detection of the pump current.

Thus, based on the pump current, the increase in temperatures in oil pipes 11, 12 controlled by electric oil pump 10, in other words, replacement of oils is detected, and the operation preparation is finished accordingly. This allows the operation preparation (time) to be performed just enough, thereby making it possible to achieve elimination of waste power consumption and suppression of heat generation.

In other words, from the viewpoint that the pump current changes in response to a pump load which depends on a temperature (viscosity) of oil, the increase in the oil temperature is detected based on the pump current at the target rotational speed so as to perform the operation-preparation completion determination. This makes it possible to perform precise determination on operation-preparation completion without adding oil-temperature sensors in the oil pipes.

Note that the determination on "pump current≤(is lower than or equal to) threshold" is not just performed, but it is further preferable to perform the judgment on "pump current≤(is lower than or equal to) threshold" after ascertaining that "pump current>(is greater than) threshold" has been satisfied before.

Furthermore, as illustrated in FIG. 3, a current on that common line of the U-, W-, and V-phase arms which is provided on the side of ground GND may be detected as the pump current, or alternatively, respective phase currents of the U, W, and V phases may be detected directly.

Figure 11A:
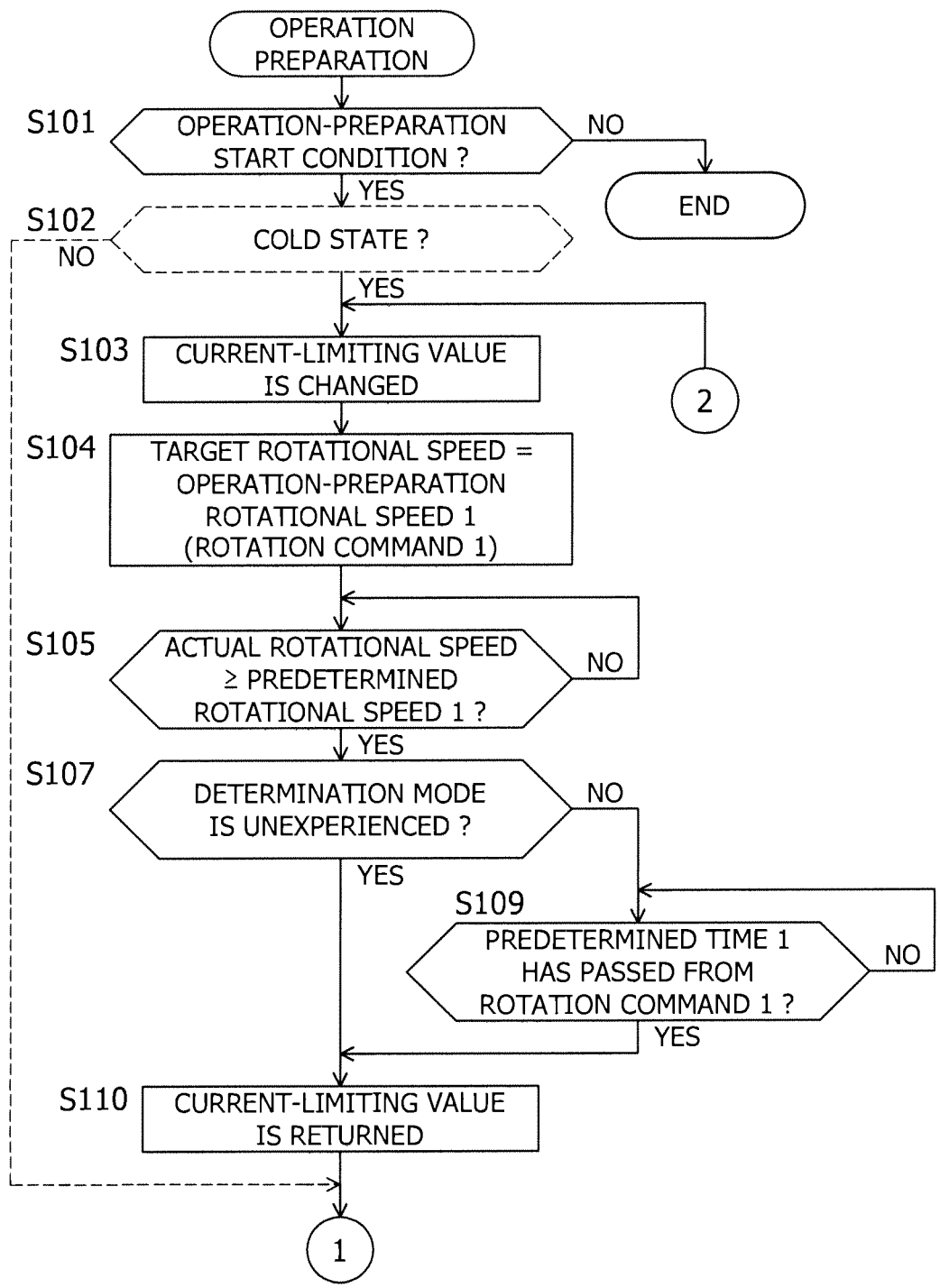
FIG. 11 is a flowchart of a routine of operation preparation of an electric oil pump in the fifth embodiment.
Figure 11B:
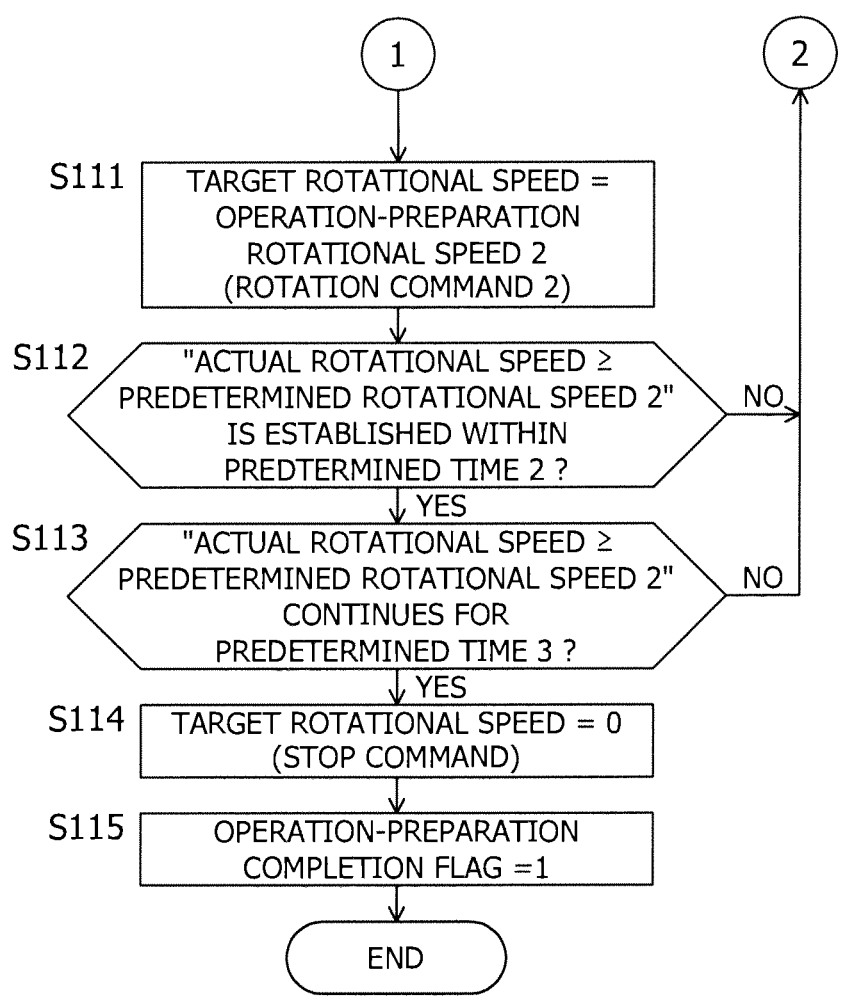
Figure 12:
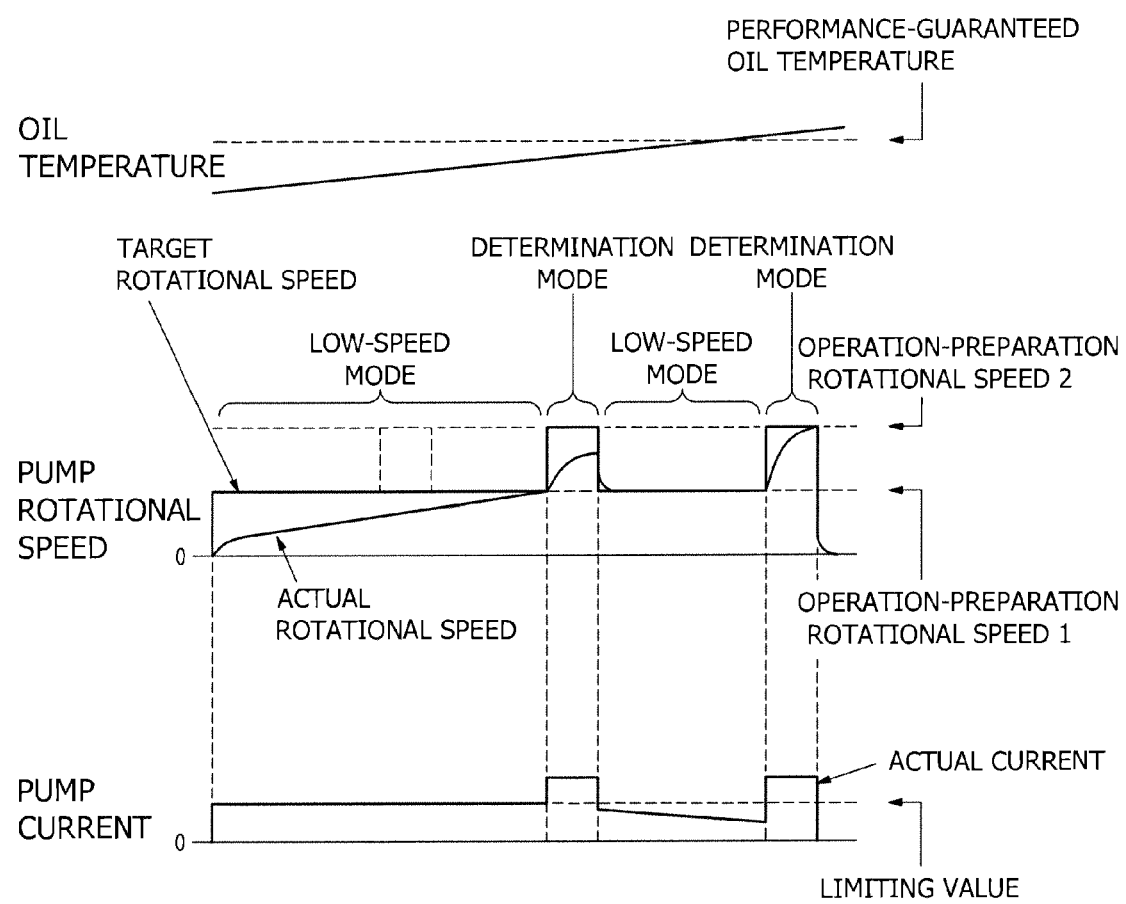
FIG. 12 is a view illustrating behavior such as a pump rotational speed at the time of operation preparation in the fifth embodiment.

FIG. 11 is a flowchart of a routine of operation preparation of electric oil pump 10 in the fifth embodiment. This routine is also performed just after power is turned on, and subsequently performed every predetermined time. Furthermore, FIG. 12 illustrates behavior such as a pump rotational speed at the time of operation preparation in the fifth embodiment, and will be referred to as well.

In the flowchart of FIG. 11, the same step as in the flowchart of FIG. 7 is referred to by the same reference sign, and the following describes a different point. The different point is that a process of S110 and a process of S103 are added to the flowchart of FIG. 7.

That is, in advance of the process of the low-speed operation preparation mode (S104 to S109), the process of S103 is added, and in S103, a current-limiting value is changed to a smaller value.

Furthermore, in advance of the process of the operation preparation and determination mode (S111 to S113), the process of S110 is added, and in S110, the current-limiting value is returned back to a larger value.

In the control of electric oil pump 10, an actual rotational speed is compared with a target rotational speed, and a feedback control is performed on a current so that these speeds are equal to each other. At this time, a limiting value is set to this current beforehand so as to limit the current. Accordingly, control unit 20 includes a pump-current limiting section for limiting the current of electric oil pump 10 to a predetermined limiting value or less as software.

Under such a premise, in the present embodiment, the limiting value is set to be variable so that during the low-speed operation preparation mode, the limiting value is set to be a smaller value in comparison with that during the operation preparation and determination mode.

The present embodiment is configured to include a pump-current limiting section for limiting a current of electric oil pump 10 to a predetermined limiting value or less so that the limiting value is set to a smaller value during the low-speed operation preparation mode in comparison with the value during the operation preparation and determination mode. According to the present embodiment, heat generation during the low-speed operation preparation mode can be decreased, thereby enhancing heat resistance. That is, in a case in which the current is not limited during the low-speed operation preparation mode, the temperature reaches a temperature limit during this mode, which may make it difficult to perform the operation preparation and determination mode on the high-rotation side. In view of this, the current is limited during the low-speed operation preparation mode to restrain heat generation, thereby preventing the operation preparation and determination mode from being difficult to perform.

Figure 13A:
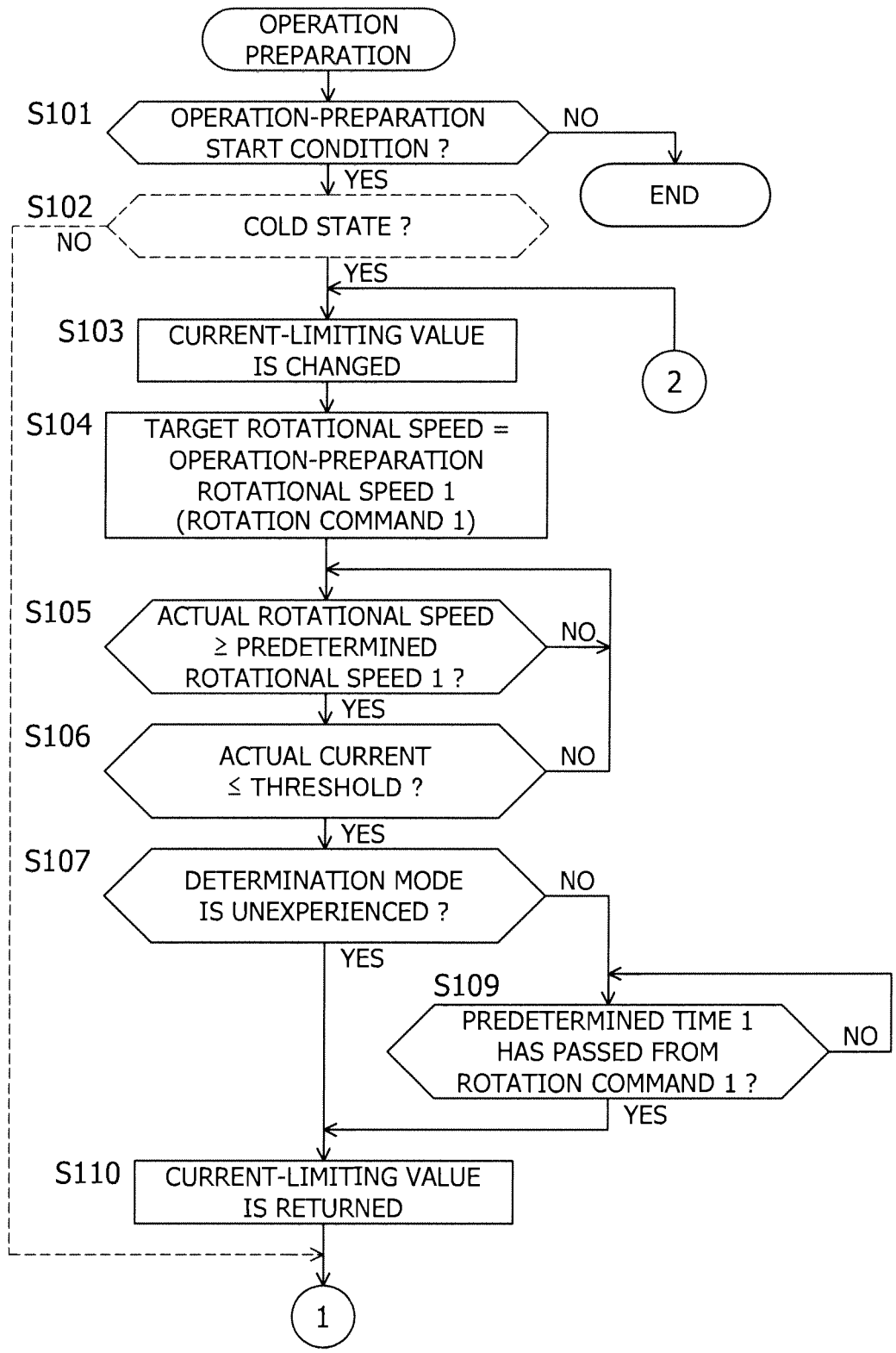
FIG. 13 is a flowchart of a routine of operation preparation of an electric oil pump in the sixth embodiment.
Figure 13B:
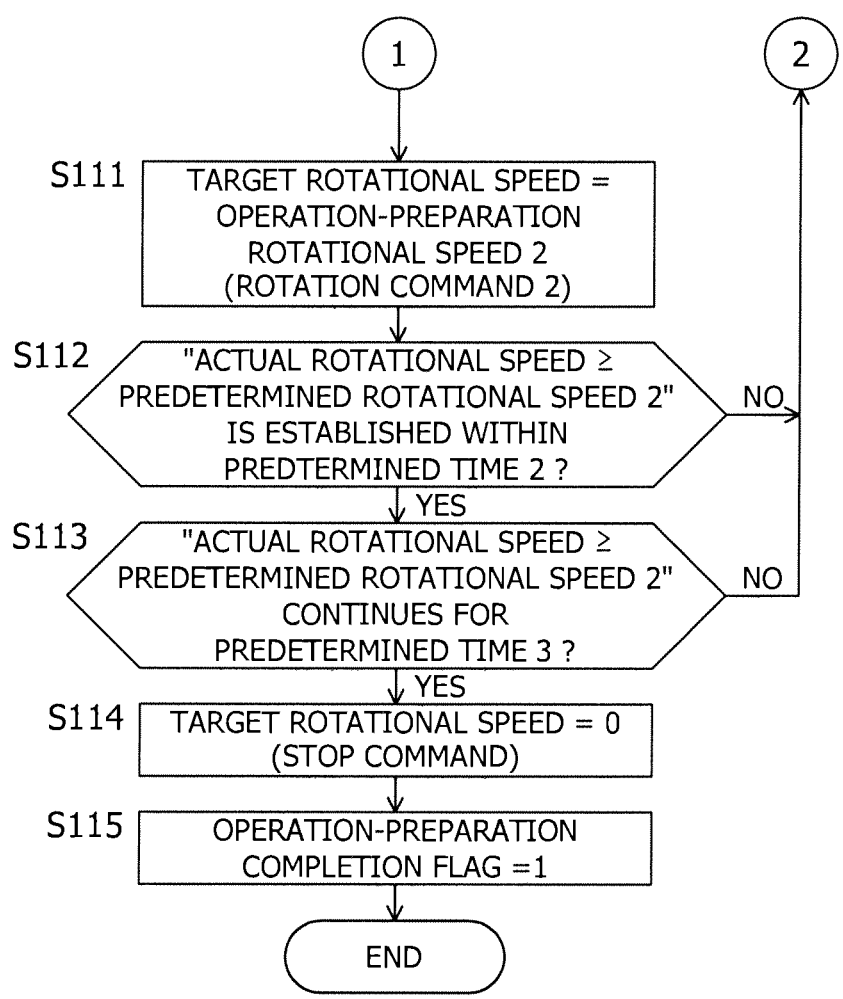
Figure 14:
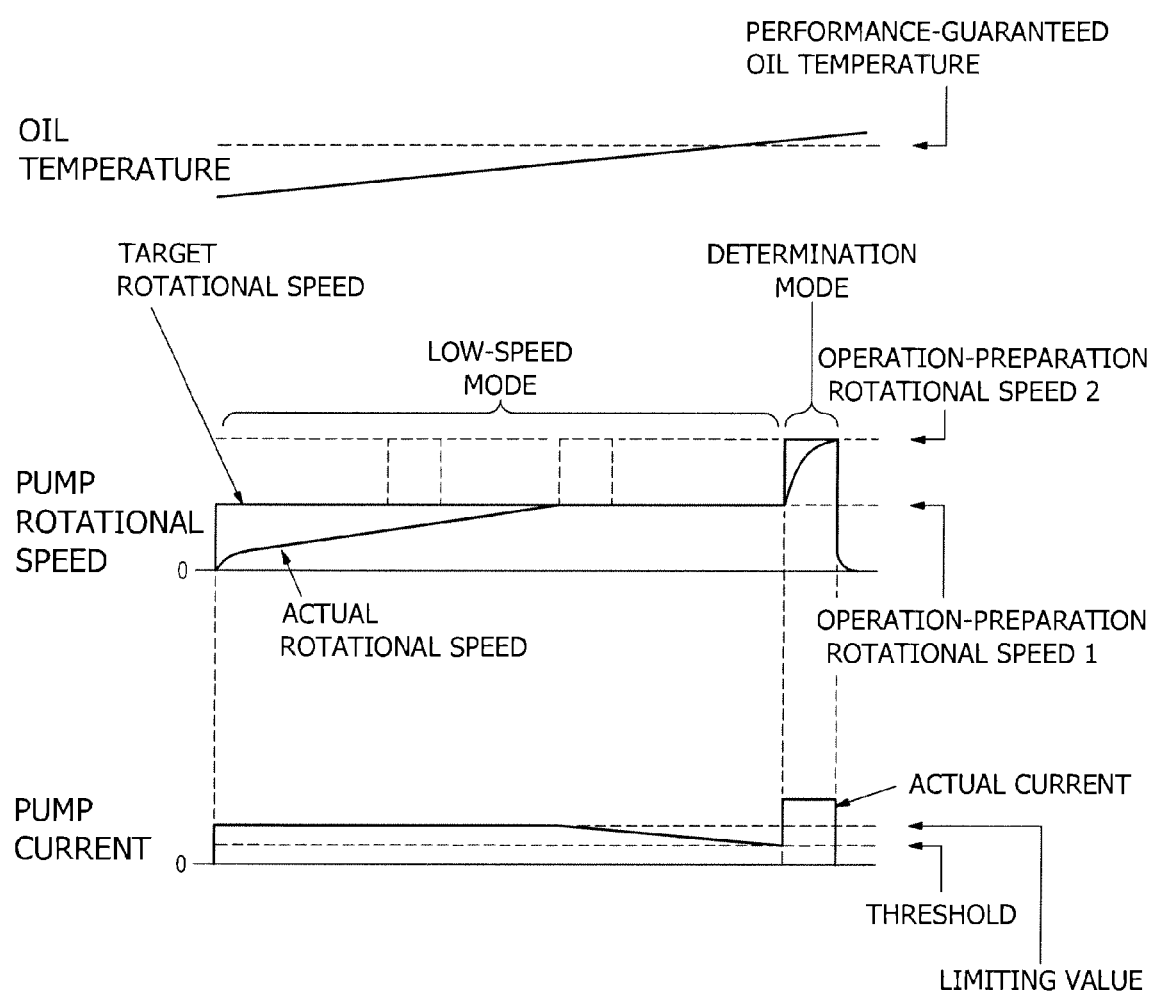
FIG. 14 is a view illustrating behavior such as a pump rotational speed at the time of operation preparation in the sixth embodiment.

FIG. 13 is a flowchart of a routine of operation preparation of electric oil pump 10 in the sixth embodiment. This routine is also performed just after power is turned on, and subsequently performed every predetermined time. Furthermore, FIG. 14 illustrates behavior such as a pump rotational speed at the time of operation preparation in the sixth embodiment, and will be referred to as well.

In the flowchart of FIG. 13, the same step as in the flowchart of FIG. 9 is referred to by the same reference sign, and the following describes a different point. The different point is that a process of S103 and a process of S110 are added to the flowchart of FIG. 9.

That is, in advance of the process of the low-speed operation preparation mode (S104 to S109), the process of S103 is added, and in S103, a current-limiting value is changed to a smaller value.

Furthermore, in advance of the process of the operation preparation and determination mode (S111 to S113), the process of S110 is added, and in S110, the current-limiting value is returned back to a larger value.

That is, the present embodiment is in combination of the fourth embodiment and the fifth embodiment, and the same effects as in these embodiments are obtained. Note that as apparent from FIG. 14, it goes without saying that it is assumed that the current-limiting value is greater than the threshold.

The following further discusses execution conditions of this operation-preparation control.

When a drive request for operation preparation of the electric oil pump is sent or when a power-supply voltage becomes less than a predetermined value during the drive, the drive is stopped or restrained. On this occasion, in view of characteristics of a battery, when an outdoor temperature or the like is low, a threshold to the power-supply voltage may be increased.

That is, generally, the power supply of this system is also used for engine start-up, and when it is expected that subsequent start-up would be difficult, the drive is stopped. The reason is as follows: during idle stop in particular, it is general that the engine is restarted subsequently, but this restart would be difficult in such a circumstance. Here, power is supplied from an alternator during engine rotation, so that a state of the battery (for example, considerably deep discharge due to start-up at a low temperature) is often hard to be found. The state of the battery can be easily found appropriately if it is determined by a voltage state after the idle stop.

In a case in which the supply target from the electric oil pump provides a high request, for example, in a case of emergency, the electric oil pump is driven regardless of operation-permission conditions of the pump or by relaxing the conditions. On this occasion, abnormality determination on work-load relations (between current and supply amount, and the like) is relaxed or stopped.

That is, in a case of a heavy-load start, such as a hill start in a traction state under a very low temperature, even if an outdoor temperature, an oil temperature, and the like are low, a start clutch may enter a dangerous temperature state in some cases. In such cases, the drive is performed regardless of any conditions or by relaxing the conditions. On this occasion, it is more likely that the determination on general work-load relations may result in abnormal values due to high-viscosity oil, friction at each part, and the like. In view of this, the determination is relaxed (a threshold for determination may be changed, or the like) or the determination is stopped.

Note that in the embodiments as illustrated in the drawings, electric oil pump 10 is configured to supply cooling oil to clutch 4 in transmission 3. However, electric oil pump 10 is not limited to this, and may be configured to supply oil to at least a part of transmission 3 so as to provide a hydraulic-oil pressure or oil for lubrication and cooling.

Furthermore, in the embodiments as illustrated in the drawings, the pipe of mechanical oil pump 7 and the pipe of electric oil pump 10 on the discharge side are provided as completely separate pathways. However, they may be provided to join each other while being prevented by check valves from causing reverse flow. Note that, in this case, it is necessary to set the rotational speed so that a discharge pressure of electric oil pump 10 exceeds opening-valve pressures at the check valves and the like.

The entire contents of Japanese Patent Applications No. 2011-061893 filed on Mar. 23, 2011 and No. 2012-034800 filed on Feb. 21, 2012, on which priority is claimed, are incorporated herein by reference.

While only a select embodiment has been chosen to illustrate and describe the present invention, it will be apparent to those skilled in the art from this disclosure that various changes and modifications can be made herein without departing from the scope of the invention as defined in the appended claims.

Furthermore, the foregoing description of the embodiment according to the present invention is provided for illustration only, and it is not for the purpose of limiting the invention, the invention as claimed in the appended claims and their equivalents.

What is claimed is:

1. A control apparatus for controlling an electric oil pump which is provided in parallel with a mechanical oil pump driven by an internal combustion engine serving as a power source of a vehicle to supply oil to a transmission of the vehicle, and is arranged to supply oil to at least a part of the transmission, the control apparatus comprising:
an operation preparation and determination mode section configured to
target the rotation of the electric oil pump at a second operation-preparation rotational speed in advance of an operation request to the electric oil pump, and
determine that operation preparation is completed when an actual rotational speed reaches the second operation-preparation rotational speed;
a low-speed operation preparation mode section configured to target the rotation of the electric oil pump at a first operation-preparation rotational speed which is lower than the second operation-preparation rotational speed under one or more conditions for which rotation is performed before the control apparatus determines that the operation preparation is completed; and
a pump-current limiting section configured to limit a current of the electric oil pump to a predetermined limiting value or less.

2. The control apparatus for controlling the electric oil pump according to claim 1, wherein:
the control apparatus is configured to operate the low-speed operation preparation mode section and then the operation preparation and determination mode section in advance of the operation request to the electric oil pump, and
upon a determination that the operation preparation is not completed, the control apparatus is configured to repeatedly operate the low-speed operation preparation mode and operation preparation and determination mode sections in order of the low-speed operation preparation mode section and the operation preparation and determination mode section.

3. The control apparatus for controlling the electric oil pump according to claim 1, further comprising:
a sensor configured to detect whether the transmission is in a cold state or in a warm-up completion state,
wherein, in a case in which the transmission is in the cold state, the control apparatus is configured to operate the low-speed operation preparation mode section and the operation preparation and determination mode section in order of the low-speed operation preparation mode section and the operation preparation and determination mode section, in advance of the operation request to the electric oil pump, and upon a determination that the operation preparation is not completed, the control apparatus is configured to repeatedly operate the low-speed operation preparation mode and operation preparation and determination mode sections in order; and
wherein, in a case in which the transmission is in the warm-up completion state, the control apparatus is configured to operate the operation preparation and determination mode section first in advance of the operation request to the electric oil pump, and upon the determination that the operation preparation is not completed, the control apparatus is configured to repeatedly the low-speed operation preparation mode section and the operation preparation and determination mode section in order of the low-speed operation preparation mode section and the operation preparation and determination mode section.

4. The control apparatus for controlling the electric oil pump according to claim 1, wherein:
the control apparatus is configured to operate the operation preparation and determination mode section first in advance of the operation request to the electric oil pump, and upon a determination that the operation preparation is not completed, the control apparatus is configured to repeatedly operate the low-speed operation preparation mode section and the operation preparation and determination mode section in order of the low-speed operation preparation mode section and the operation preparation and determination mode section.

5. The control apparatus for controlling the electric oil pump according to claim 1, wherein:
the control apparatus is configured to interpret a determination that the operation preparation is completed as a signal so as to permit idle stop of the internal combustion engine or starting of the vehicle.

6. The control apparatus for controlling the electric oil pump according to claim 1, wherein:
the low-speed operation preparation mode section is configured to permit shift to an operation preparation and determination mode when an execution time of a low-speed operation preparation mode elapses over a predetermined time.

7. The control apparatus for controlling the electric oil pump according to claim 1, wherein:
the low-speed operation preparation mode section is configured to permit shift to an operation preparation and determination mode at least when the actual rotational speed reaches the first operation-preparation rotational speed by execution of a low-speed operation preparation mode.

8. The control apparatus for controlling the electric oil pump according to claim 1, wherein
the low-speed operation preparation mode section is configured to permit shift to an operation preparation and determination mode when the actual rotational speed reaches the first operation-preparation rotational speed and an actual current of the electric oil pump decreases to a predetermined threshold or less by execution of a low-speed operation preparation mode.

9. The control apparatus for controlling the electric oil pump according to claim 1,
wherein the limiting value is set to a smaller value during a low-speed operation preparation mode in comparison with a value during an operation preparation and determination mode.

10. A method for controlling an electric oil pump which is provided in parallel with a mechanical oil pump driven by an internal combustion engine serving as a power source of a vehicle to supply oil to a transmission of the vehicle, and is arranged to supply oil to at least a part of the transmission, the control method comprising:
in an operation preparation and determination mode, target rotating the electric oil pump at a second operation-preparation rotational speed in advance of an operation request to the electric oil pump, and judging that operation preparation is completed when an actual rotational speed reaches the second operation-preparation rotational speed;
in a low-speed operation preparation mode, target rotating the electric oil pump at a first operation-preparation rotational speed which is lower than the second operation-preparation rotational speed under one or more conditions for which rotation is performed before a determination that the operation preparation is completed; and
limiting a current of the electric oil pump to a predetermined limiting value or less.

11. The method for controlling the electric oil pump according to claim 10, wherein:
the low-speed operation preparation mode and the operation preparation and determination mode are performed in order of the low-speed operation preparation mode and the operation preparation and determination mode in advance of the operation request to the electric oil pump, and upon a determination that the operation preparation is not completed, the low-speed operation preparation and operation preparation and determination modes are repeatedly performed in order.

12. The method for controlling the electric oil pump according to claim 10, further comprising:
detecting whether the transmission is in a cold state or in a warm-up completion state, wherein:
in a case in which the transmission is in the cold state, the low-speed operation preparation mode and the operation preparation and determination mode are performed in order of the low-speed operation preparation and operation preparation and determination modes in advance of the operation request to the electric oil pump, and upon a determination that the operation preparation is not completed, the low-speed operation preparation and operation preparation and determination modes are repeatedly performed in order; and
in a case in which the transmission is in the warm-up state, the operation preparation and determination mode is performed first in advance of the operation request to the electric oil pump, and upon the determination that the operation preparation is not completed, the low-speed operation preparation mode and the operation preparation and determination mode are repeatedly performed in order of the low-speed operation preparation mode and the operation preparation and determination mode.

13. The method for controlling the electric oil pump according to claim 10, wherein:
the operation preparation and determination mode is performed first in advance of the operation request to the electric oil pump, and upon determination that the operation preparation is not completed, the low-speed operation preparation mode and the operation preparation and determination mode are repeatedly performed in order of the low-speed operation preparation mode and the operation preparation and determination mode.

14. The method for controlling the electric oil pump according to claim 10, further comprising:
in the low-speed operation preparation mode, permitting shift to the operation preparation and determination mode when an execution time of the low-speed operation preparation mode elapses over a predetermined time.

15. The method for controlling the electric oil pump according to claim 10, further comprising:
in the low-speed operation preparation mode, permitting shift to the operation preparation and determination mode at least when the actual rotational speed reaches the first operation-preparation rotational speed by execution of the low-speed operation preparation mode.

16. The method for controlling the electric oil pump according to claim 10, further comprising:
in the low-speed operation preparation mode, permitting shift to the operation preparation and determination mode when the actual rotational speed reaches the first operation-preparation rotational speed and an actual current of the electric oil pump decreases to a predetermined threshold or less by execution of the low-speed operation preparation mode.

17. The method for controlling the electric oil pump according to claim 10, wherein the limiting value is set to a smaller value during the low-speed operation preparation mode in comparison with a value during the operation preparation and determination mode.

18. A method for controlling an electric oil pump which is provided in parallel with a mechanical oil pump driven by an internal combustion engine serving as a power source of a vehicle to supply oil to a transmission of the vehicle, and is arranged to supply oil to at least a part of the transmission, the control method comprising:

in an operation preparation and determination mode, target rotating the electric oil pump at a second operation-preparation rotational speed in advance of an operation request to the electric oil pump, and judging that operation preparation is completed when an actual rotational speed reaches the second operation-preparation rotational speed; and in a low-speed operation preparation mode, target rotating the electric oil pump at a first operation-preparation rotational speed which is lower than the second operation-preparation rotational speed under one or more conditions for which rotation is performed before a determination that the operation preparation is completed, wherein in accordance with the determination that the operation preparation is completed, idle stop of the internal combustion engine or starting of a vehicle is permitted.

* * * * *